(12) United States Patent
Varanda

(10) Patent No.: US 7,489,923 B2
(45) Date of Patent: Feb. 10, 2009

(54) METHODS AND SYSTEMS FOR HANDLING SOFTWARE OPERATIONS ASSOCIATED WITH STARTUP AND SHUTDOWN OF HANDHELD DEVICES

(75) Inventor: Marcelo Varanda, Kanata (CA)

(73) Assignee: Research In Motion Limited, Waterloo (CA)

( * ) Notice: Subject to any disclaimer, the term of this patent is extended or adjusted under 35 U.S.C. 154(b) by 513 days.

(21) Appl. No.: 11/198,687

(22) Filed: Aug. 5, 2005

(65) Prior Publication Data
US 2007/0032228 A1 Feb. 8, 2007

(51) Int. Cl.
H04M 3/00 (2006.01)

(52) U.S. Cl. ............ 455/418; 455/550.1; 455/411

(58) Field of Classification Search .......... 455/418, 455/550.1, 411, 412.1; 365/163, 154
See application file for complete search history.

(56) References Cited

U.S. PATENT DOCUMENTS 5,203,028 A * 4/1993 Shiraishi ............ 455/154.1
5,761,485 A * 6/1998 Munyan ............ 455/411
6,209,088 B1 * 3/2001 Reneris ............ 713/1
7,178,053 B2 * 2/2007 Ho ............ 714/5
2004/0097244 A1 * 5/2004 Yamazaki et al. ........ 455/456.3
2005/0266871 A1 * 12/2005 Tan et al. ............ 455/550.1
2007/0032228 A1 * 2/2007 Varanda ............ 455/418

OTHER PUBLICATIONS

European Search Report of Application No. 05017068.7-2211, date of mailing Mar. 27, 2006—5pgs.

* cited by examiner

*Primary Examiner*—Dwayne D Bost
*Assistant Examiner*—Huy D Nguyen
(74) *Attorney, Agent, or Firm*—Jones Day; Krishna K. Pathiyal; Robert K. Liang

(57) ABSTRACT

Systems and methods for improving software operations on startup. A system and method can provide for the storage of volatile memory contents of an application upon shutdown of a mobile device, and restoration of the contents upon startup.

25 Claims, 25 Drawing Sheets

US 7,489,923 B2

METHODS AND SYSTEMS FOR HANDLING SOFTWARE OPERATIONS ASSOCIATED WITH STARTUP AND SHUTDOWN OF HANDHELD DEVICES

BACKGROUND

1. Technical Field

This system relates generally to the field of communications, and in particular to startup and shutdown operations of mobile wireless communications devices ("mobile devices").

2. Discussion of Related Art

Mobile computing devices, such as laptop computers, personal data assistants (PDAs), and cellular telephones, are becoming commonplace in society. These mobile computing devices may run software including operating systems, virtual machines, and various applications that perform desired tasks such as task scheduling and electronic communications. Users of the mobile computing devices may turn the device off and on again many times during the course of the day. Present mobile computing devices can be inefficient in their response to a shut down/startup request.

DETAILED DESCRIPTION OF THE DRAWINGS

Figure 1:
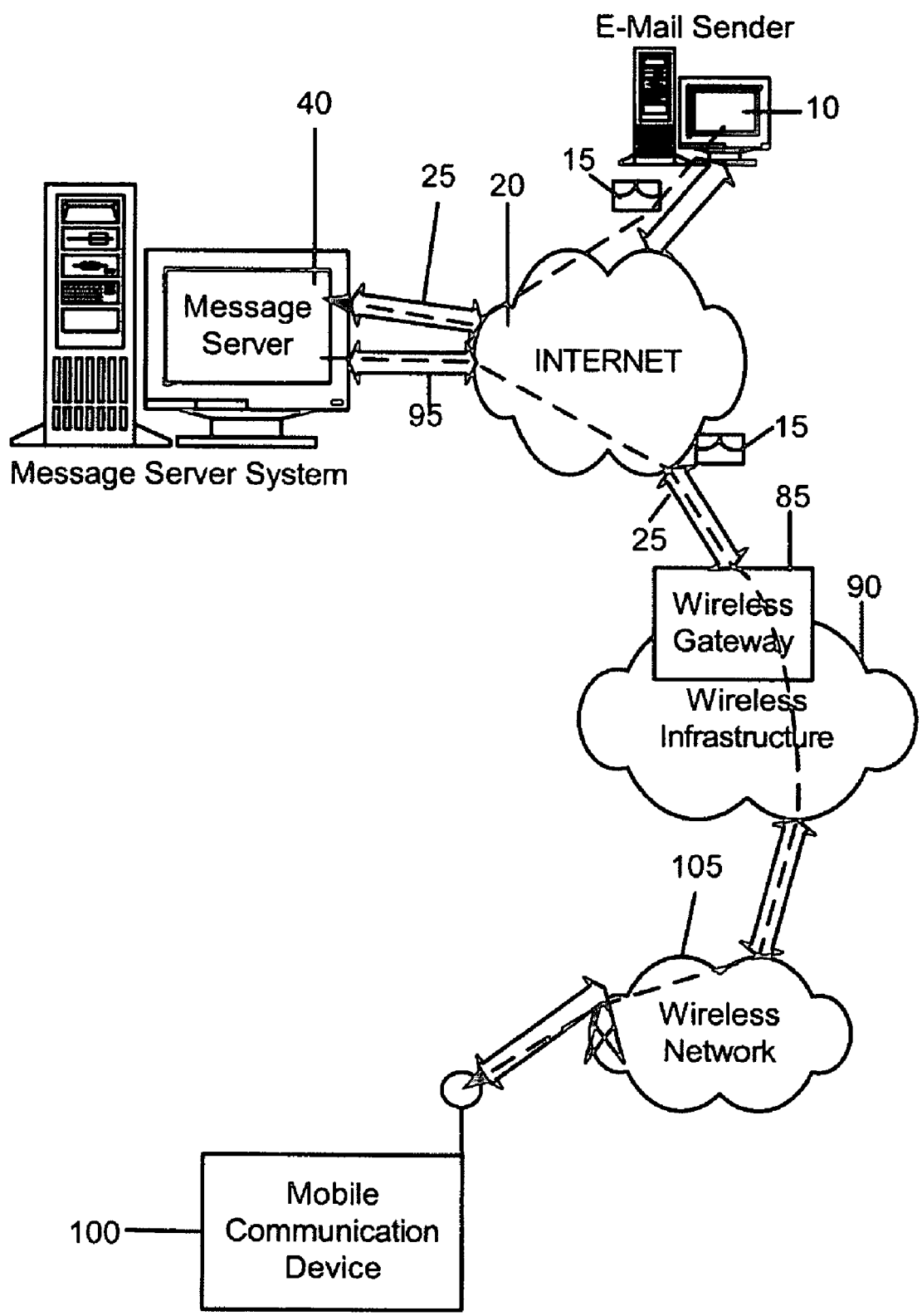
FIG. 1 is an overview of an example communication system in which a mobile device may be used.

In accordance with the teachings provided herein, methods and systems for improving software operations upon shutdown and startup are provided. For example, a system and method may include transferring volatile memory contents to nonvolatile memory upon shutdown, and restoring the volatile memory contents from nonvolatile memory upon startup.

As another example, a system and method may include a shutdown manager configured to receive notification of an impending shutdown on a mobile communications device, to notify an application of the shutdown, and to assign a memory block of a nonvolatile memory to the application. The shutdown manager is further configured to retain power until the application has stored its volatile memory contents to the assigned memory block. A startup manager is configured to transfer the stored volatile memory contents back to volatile memory for use by the application based upon receiving a startup request.

As another example, a method for operation upon a mobile communications device can include the following steps: receiving notification of a shutdown request; notifying at least one application executing on the mobile communications device of the shutdown request; and, simulating a shutdown of the mobile communications device by powering down input/output devices; wherein volatile memory contents associated with said at least one application are stored in a nonvolatile memory device before completing shutdown of the mobile communications device As another example, a system for handling software operations occurring on a mobile communications device is provided, wherein nonvolatile memory is configured to hold data after shutdown of the mobile communications device, and volatile memory is configured to store volatile memory contents for an application during execution on the mobile wireless communications device; the system comprising. The system includes a shutdown manager and a startup manager. The shutdown manager is configured to receive notification of an impending shutdown on the mobile communications device, to notify an application of the impending shutdown and to assign a memory block of the nonvolatile memory to the application. The shutdown manager is further configured to retain power until the application has stored its volatile memory contents to the assigned memory block. The startup manager is configured to transfer the stored memory contents back to volatile memory for use by the application based upon the mobile communications device receiving a startup request.

As another example, a method for operation upon a mobile communications device can include the following steps:

receiving notification of a shutdown request; notifying at least one application executing on the mobile communications device of the shutdown request; wherein volatile memory contents associated with said at least one application are stored in a nonvolatile memory device before shutdown of the mobile communications device, thereby avoiding the loss of the volatile memory contents upon said shutdown; and, upon a power up request, restoring said at least one application with the volatile memory contents that were stored prior to shutdown.

The systems and methods disclosed herein for improving software operations associated with startup and shutdown. FIG. 1 is an overview of an example communication system in which a mobile device may be used. The figure shows an e-mail sender 10 connected to a wide area network (WAN) which in this example, is the Internet 20. Also shown are an e-mail message 15, a message server system 40, a wireless gateway 85, a wireless infrastructure 90, a wireless network 105 and a mobile communication device 100.

The e-mail sender 10 may, for example, be connected to the Internet 20 through an Internet Service Provider (ISP) on which a user of the e-mail sender 10 has an account. Alternatively the e-mail sender 10 may be located within a company, connected to a local area network (LAN) which is connected to the Internet 20, or connected to the Internet 20 through a large application service provider (ASP).

The e-mail message 15 is sent by a user of the e-mail sender 10 to a user of the mobile communication device 100. Delivery of the e-mail message 15 is accomplished with the use of the message server 40 and other components. The message server 40 may be implemented, for example, to act as the main interface with the Internet 20. Although other messaging systems might not require the message server system 40, the mobile device 100 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail (not shown).

The wireless gateway 85 and the wireless infrastructure 90 provide a link between the Internet 20 and the wireless network 105. The wireless infrastructure 90 determines a most likely network for locating a given user and tracks the user as they roam between networks. A message is delivered to the mobile device 100 via wireless transmission, typically at a radio frequency (RF), from a base station in the wireless network 105 to the mobile device 100.

Regardless of the specific mechanism controlling the forwarding of messages to the mobile device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or Ti connections using the TCP/IP protocol used throughout the Internet. As used herein, the term "wireless network" specifically includes three different types of networks: (1) data-centric wireless networks, (2) voice-centric wireless networks and (3) dual-mode networks that can support both voice and data communications over the same physical base stations. Examples of combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
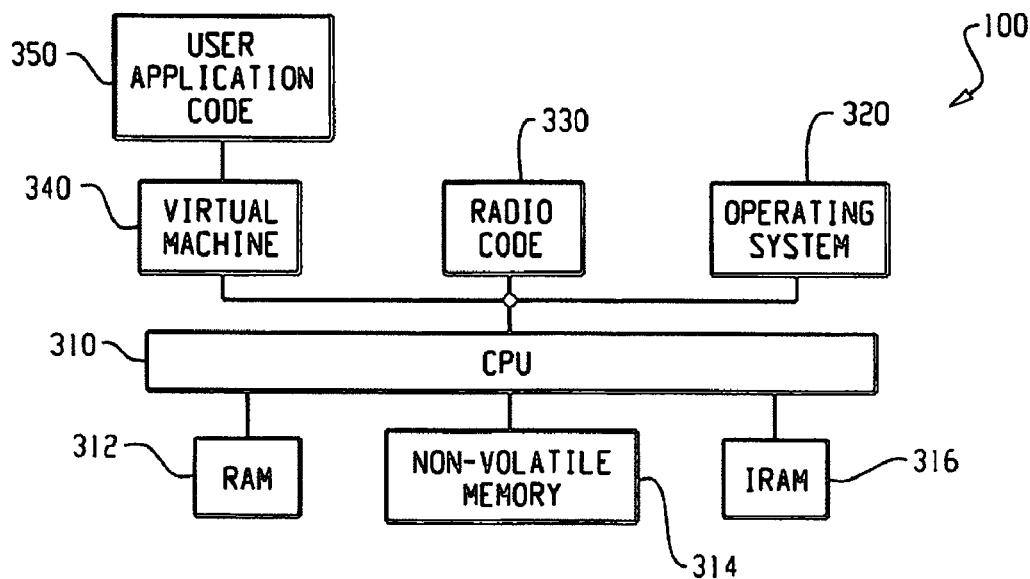
FIG. 2 is a block diagram depicting application code configured to operate on a mobile device.

FIG. 2 depicts application code (e.g., user application code 350) operating on a mobile device 100 that contains an error-handling system. A mobile device 100 includes a microprocessor 310 which is coupled (e.g., has a direct/indirect data communication pathway) to the RAM 312, the nonvolatile memory 314, and the intelligent random access memory (IRAM) 316. Examples of the nonvolatile memory 314 are a Flash memory device, a magnetic RAM, a magnetic disk drive, a tape drive, or the like. The microprocessor 310 executes various software routines, including an operating system 320, a radio code module 330, and a virtual machine 340. Additionally, one or more user application modules 350 may execute on the virtual machine 340. The user application modules may include such applications as electronic mail (e-mail) clients, scheduling applications, text entry, or another application that may allow a user to create, send, receive, or manipulate electronic data.

FIG. 2 depicts certain components of a possible architecture and does not depict all components that may be included in such architecture. For example, architectures for mobile devices can vary based upon the desire to implement certain functional features, such as making a mobile device capable of handling both voice and data communications. The fact that other components are not depicted in the figures or discussed is in no way intended to limit the systems and methods or imply that other components cannot be included or the components shown cannot be excluded as part of the architecture of the example systems and methods. Correspondingly, one or more methods and systems disclosed herein may operate with fewer components than what is depicted in FIG. 2 depending upon the functionality needed for the methods and systems.

Figure 3:
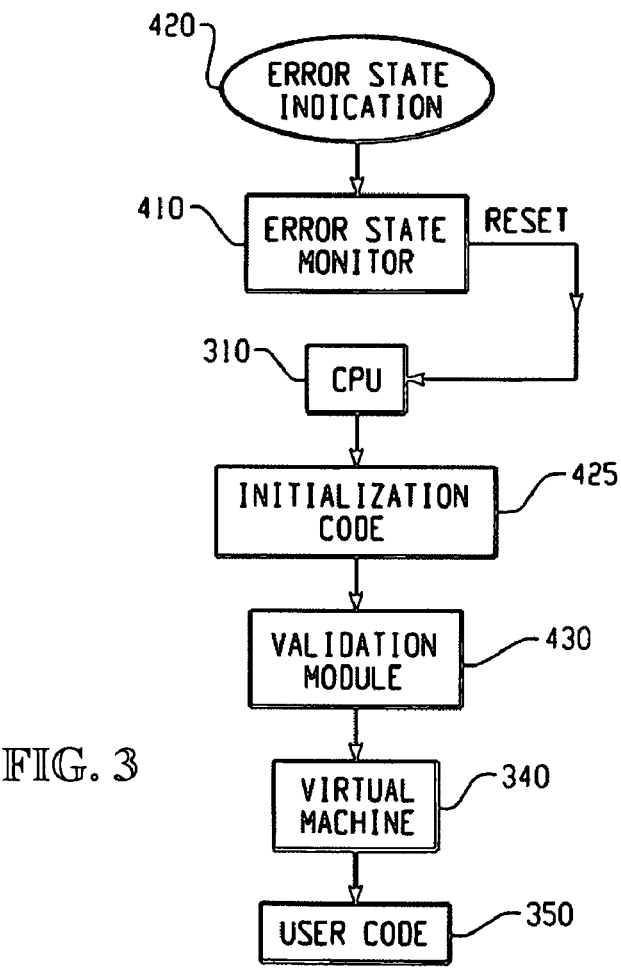
FIG. 3 is a block diagram depicting a state of a mobile device when a processing error is indicated.

FIG. 3 depicts an exemplary configuration of a mobile device at a point near in time to when a software processing error occurs. An error state monitor 410 checks for the presence of a detectable software processing error by polling other components of the mobile device 100 or by using other detection methods. The error state monitor 410 receives an error state indication 420. The error state monitor 410 may be implemented in either hardware or software. A possible hardware implementation of error state monitor 410 is as a watchdog monitor that periodically checks for responses from other hardware components, such as the microprocessor 102. A possible software implementation includes a module that repeatedly polls other software modules or processes and awaits responses from those polled modules or processes. Upon detection of an error state, the error state monitor 410 issues an instruction signal to other components to instruct the components receiving the instruction signal to perform an action. An action to be performed upon receiving an instruction signal from the error state monitor 410 includes a system reset.

Two types of system resets are discussed in connection with the mobile device 100. The first is a full system reset. In a full system reset, the mobile device is initialized by clearing the contents of the memory of the mobile device and beginning processing from a known or power-on state. Alternatively in a full system reset, the contents of the memory of the mobile device may not be cleared, but the contents are overwritten with contents provided during the full system reset procedure. A full system reset is the type of procedure that occurs when the mobile device is rebooted.

The second type of reset is called a fast reset and is discussed in more detail below. In a fast reset procedure, one or more consistency checks are performed as a way to ascertain the validity and/or integrity of the contents of the memory of the memory of the mobile device 100. Each check provides some indication as to whether the contents of the memory of the mobile device have been corrupted. In this example, if any of the results of a performed consistency check indicates that data corruption has occurred, the fast reset process ends and a full system reset is initiated. However, alternate approaches could instead use indications from a consistency check to correct data corruption or choose to ignore any corruption present to continue to complete a fast reset.

In this example, the error state monitor 410 detects when the mobile device has entered an error state. Error states include processing errors caused by both hardware malfunctions and software processing errors and specifically may include any hardware-detectable error or any non-recoverable software errors such as memory paging errors or infinite loops. When the error state monitor 410 detects an error state indication 420, the error state monitor 410 sends a reset signal to the microprocessor 310. In this example system, the reset signal from the error state monitor 410 does not affect the contents of data stored in volatile memory. Similarly, the reset signal does not affect the contents of nonvolatile memory. The reset signal initiates a reset procedure as an attempt to get the mobile device out of a perceived error state.

Upon receipt of a reset signal, the microprocessor 310 enables the activation of an initialization module 425 which activates a validation module 430. The validation module 430 begins one or more consistency checks in attempts to ascertain whether the data in the memory of the mobile device 100 (that comprises the virtual machine 340 and the user code 350) is valid (e.g., thereby warranting a fast reset) or if it has been corrupted (e.g., thereby warranting a full reset).

Figure 4:
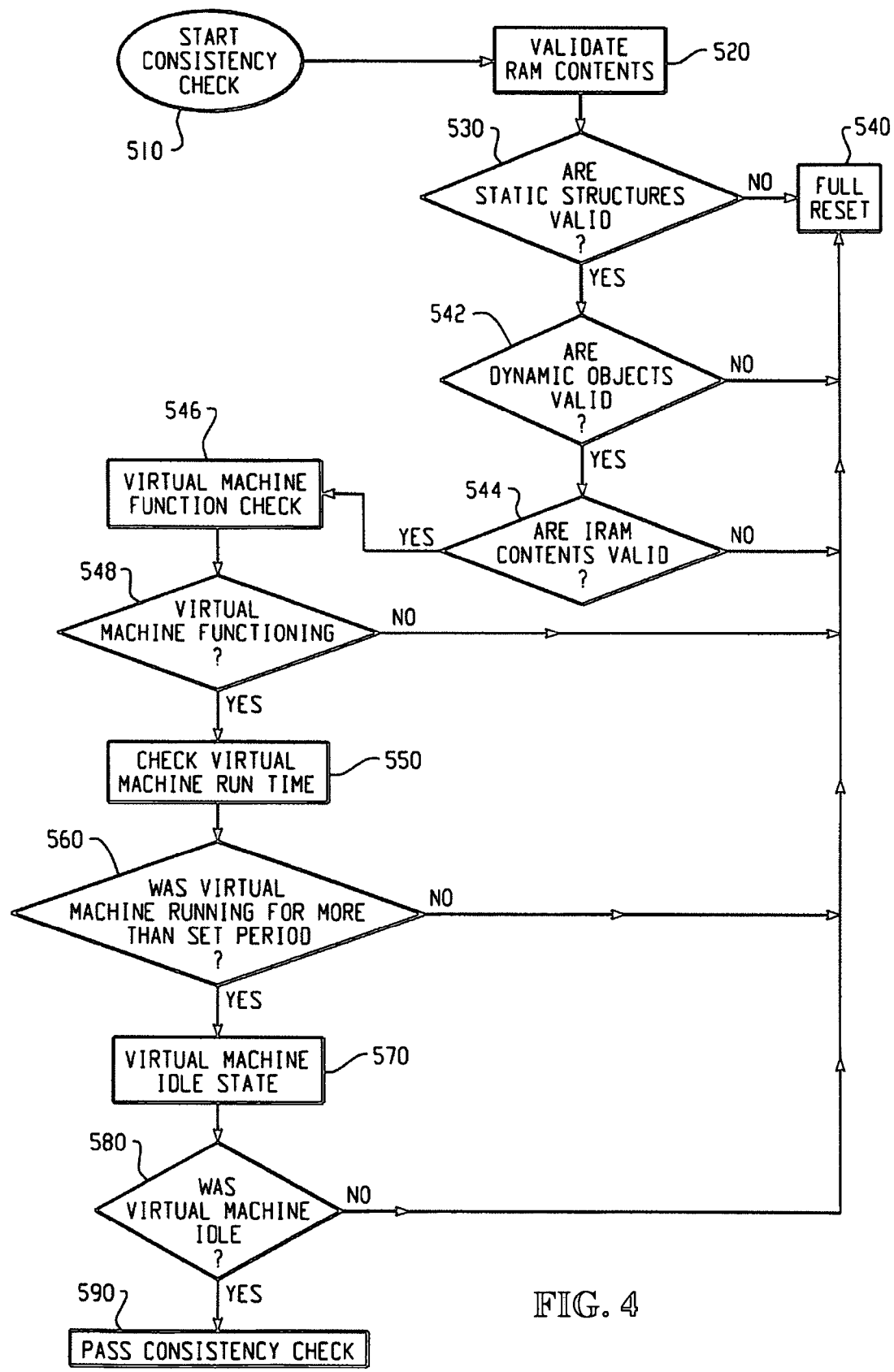
FIG. 4 is a flowchart depicting a reset procedure for a mobile device.

FIG. 4 depicts an example consistency check of data stored in volatile memory, usually a RAM such as RAM 312 and/or IRAM 316. At start block 510, the validation module 430 begins the consistency checks by checking static structures in the RAM 312. In the present example, the validation module 430 begins a data structure check on a data structure in the RAM 312 that represents the virtual machine 340. The virtual machine 340 which can be implemented via a Java virtual machine includes data markers that are incorporated into the data structure of the virtual machine 340. These markers have pre-selected values and occur at the beginning, in the middle, and at the end of the data structure. The pre-selected values of the markers are chosen in an attempt to minimize the probability that the pre-selected values were placed in the regions of the RAM 312 containing the markers by a system malfunction. In the present example, these markers are expected to appear at a set location in the RAM 312.

In the example being discussed, if a specific check is successful the consistency check process continues. If the data structure check fails, the consistency check process aborts. When the consistency check process is aborted, a full system reset is initiated by the initialization module 425. In a full system reset, all software processes are terminated and the device is rebooted. A full system reset may or may not cause data loss, depending on the particular functions being performed and other factors at the time a full system reset is initiated. The full system reset process may include resetting and/or replacing the contents of the RAM 312. The discussed examples follow a general procedure of continuing consistency checks upon determining whether tests are successful and aborting consistency checks to perform a full system reset upon determining that a test has failed.

At process block 520, the validation of the contents of the RAM 312 begins. The validity of static structures in the RAM 312 is checked at decision block 530. If the static structures are not determined to be valid, the consistency check fails at process block 540 and a full system reset is performed. If the static structures in the RAM 312 are validated, processing continues at decision block 542 by checking the validity of dynamic objects in the RAM 312. Failure to validate dynamic objects in the RAM 312 results in a full reset of the mobile device at process block 540. If the dynamic objects are validated, the consistency check continues with a check of the contents of the IRAM 316.

At decision block 544, a determination is made whether the contents of the IRAM 316 are valid. If the contents of the IRAM 316 are not determined to be valid, a full system reset occurs at process block 540. If validation is successful, the consistency check continues at process block 546 where a check is made of the functioning of the virtual machine 340. At decision block 548, a determination is made whether the virtual machine 340 was functioning properly. If the virtual machine 340 was not properly functioning, a full reset is performed at process block 540. If the virtual machine 340 was found to be functioning properly, processing continues at process block 550 to check the running time of the virtual machine 340. Decision block 560 depicts a check of whether the virtual machine 340 was operating for more than a set period of time. If not, processing continues at process block 540 where a full system reset occurs. If yes, processing continues at process block 570 where the idle state of the virtual machine 340 is checked.

Decision block 580 depicts a determination of whether the virtual machine 340 was idle at the point when the error state indication 420 was detected. This check may be performed by modifying the virtual machine 340 so that it sets a state flag in memory when it begins executing and clears the flag when entering an idle state. The state of the virtual machine 340 can then be determined by checking the status of the state flag. As depicted by decision block 580, if the virtual machine 340 was not idle when the error state indication 420 was detected, a full reset of the mobile device 100 is performed at process block 540. If the virtual machine 340 was idle, the consistency check passes and post-check processing occurs.

Figure 5A:
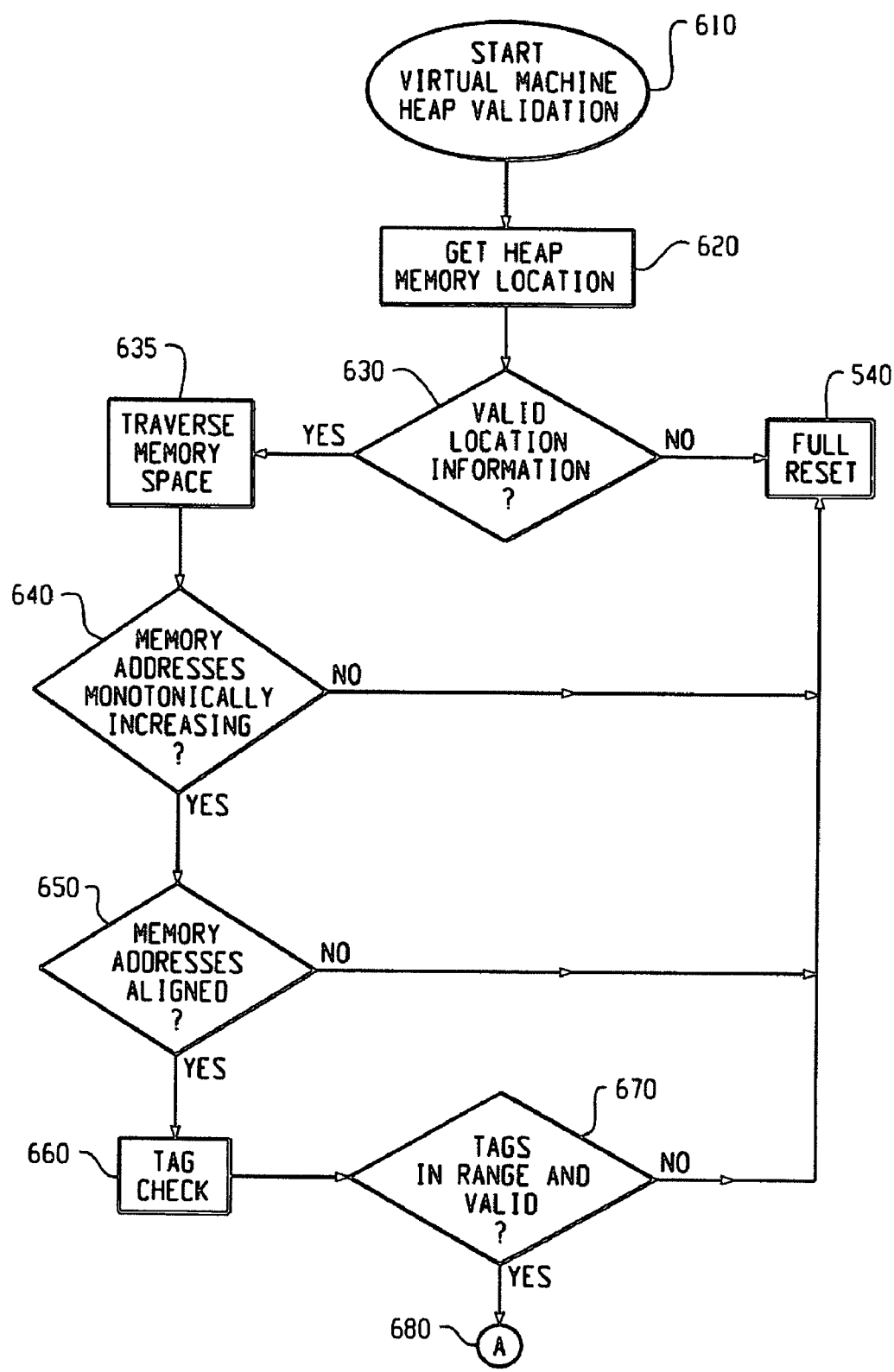
FIGS. 5a and 5b are flowcharts depicting an example procedure to validate contents of data in the heap of a virtual machine.

FIG. 5*a* is a flowchart that depicts the process of validating static structures in the RAM 312 in more detail. The validation process begins at start block 610. At process block 620, the memory addresses for the beginning and ending memory blocks in the RAM 312 containing a portion of the virtual machine 340 called the heap are obtained from the operating system 320. In the current example, objects like the virtual machine 340 are placed in the same locations in the RAM 312. Therefore, the addresses of the beginning and ending blocks of the heap of the virtual machine 340 can be obtained by querying the operating system 320. The mobile device may use a tagged memory system so that additional checks may be performed by checking the tag of a specific portion of the RAM 312.

Decision block 630 determines whether the beginning address obtained from the operating system 320 is part of the heap of the virtual machine 340. If not, a full reset occurs at process block 540. If yes, processing continues at process block 635 where the memory space of the heap is traversed. At decision block 640, a determination is reached whether the addresses of the traversed memory of the heap are monotonically increasing. If not, a full reset is performed at process block 540. If yes, a determination is made at decision block 650 whether the addresses of the traversed memory are properly aligned. If not, a full reset is performed at process block

540. If yes, then processing continues at process block 660 where a check of the memory tags is performed. Tags are checked to ensure that all tags are within a set of acceptable values, that no tag identifiers are duplicated, and that all tags are accounted for. If those determinations are successful at decision block 670, processing continues at continuation block 680. If not, a full reset occurs at process block 540.

Figure 5B:
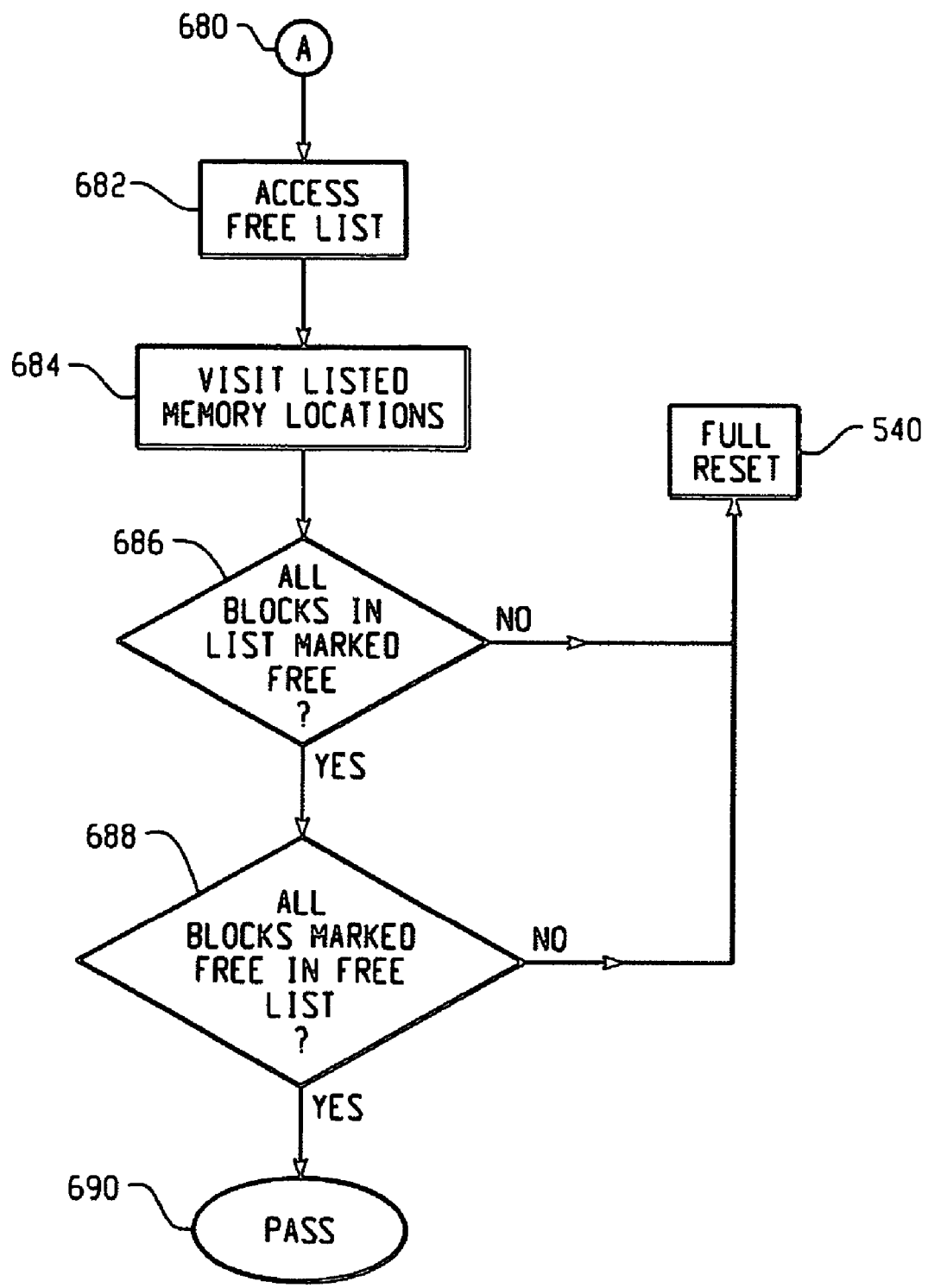

FIG. 5b is a flowchart that depicts the continuation of the heap validation process from continuation block 680. At process block 682, the free list of the virtual machine 340 is accessed. This thread free list is a list of threads of the virtual machine 340 that were not in use at the time the error state indication 420 was detected. Process block 684 depicts the processing of a check of a free list. All entries in the free list are checked by visiting a corresponding address in the RAM 312 to ensure that designated blocks in the RAM 312 are actually free. Additionally, blocks in the RAM 312 that are marked as free are checked to see whether those blocks appear in the free list. Decision block 686 determines whether all blocks listed in the free list are actually marked as free in the RAM 312 and decision block 688 determines whether blocks marked as free appear in the free list. If either determination from decision blocks 686 or 688 is no, a full reset is performed at process block 540. If both determinations are affirmative, a result that the validation was successful is reached at end block 690.

Figure 6:
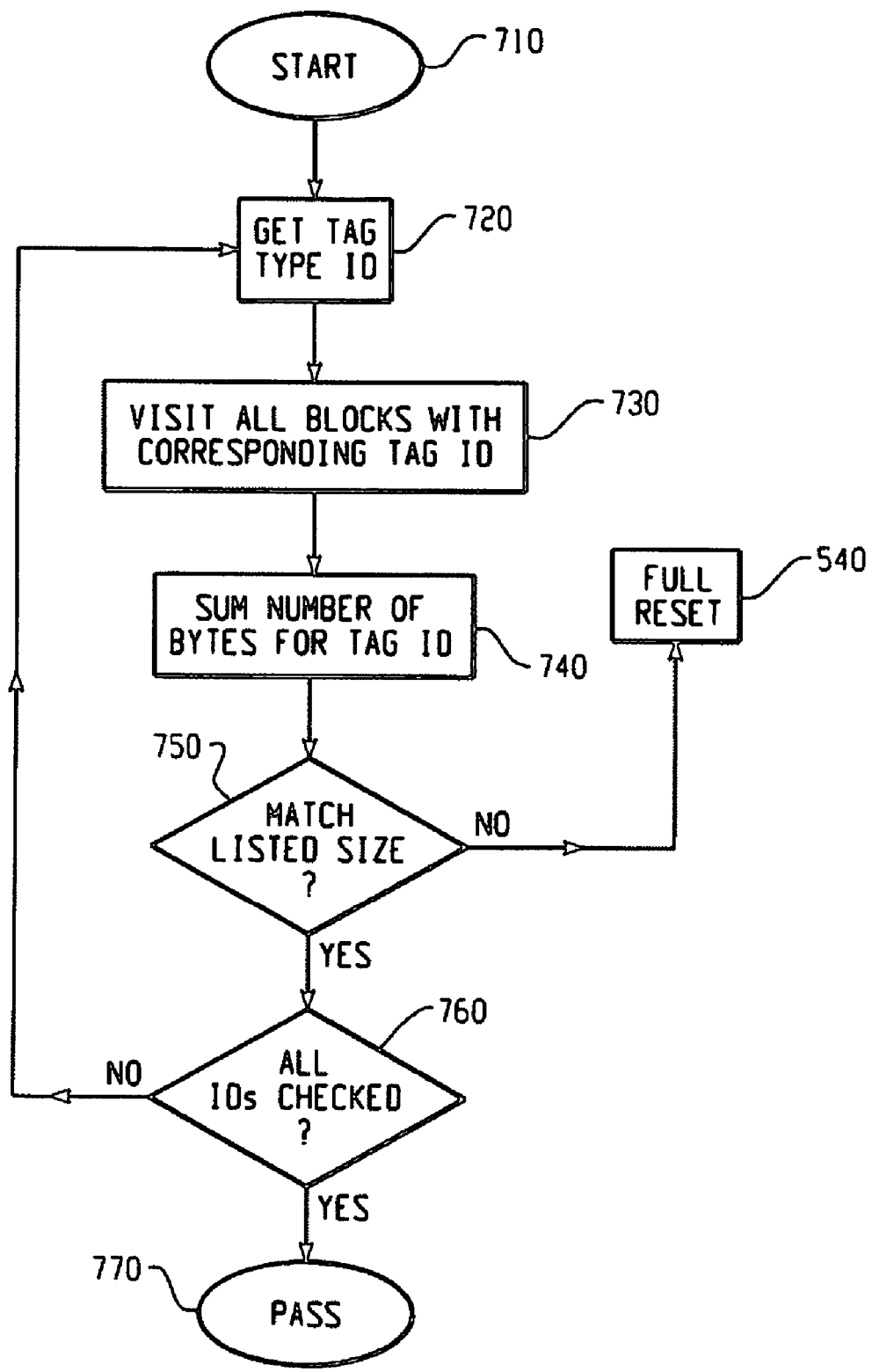
FIG. 6 is a flowchart depicting an example procedure to validate contents of data in a memory device.

FIG. 6 is a flowchart depicting a verification process of the tag list of the mobile device 100. Processing begins at start block 710 and continues at process block 720 where a tag identifier is obtained. At process block 730, all blocks in the RAM 312 with a corresponding tag identifier are visited and a sum is calculated in process block 740 that represents the total memory allocation for a corresponding tag identifier. Decision block 750 compares the sum to a value from the tag list that represents how much memory the virtual machine 340 has listed as allocated for a corresponding tag identifier. If the sum does not match the value from the tag list, a full reset of the mobile device 100 is performed at process block 540. If the sum and the value match, decision block 760 depicts that a determination is made whether all tag identifiers have been checked. If not, the process is repeated for any remaining tag identifiers until each tag identifier has been checked. Upon successful completion for all tag identifiers, end block 770 depicts that the present check has been passed.

Figure 7:
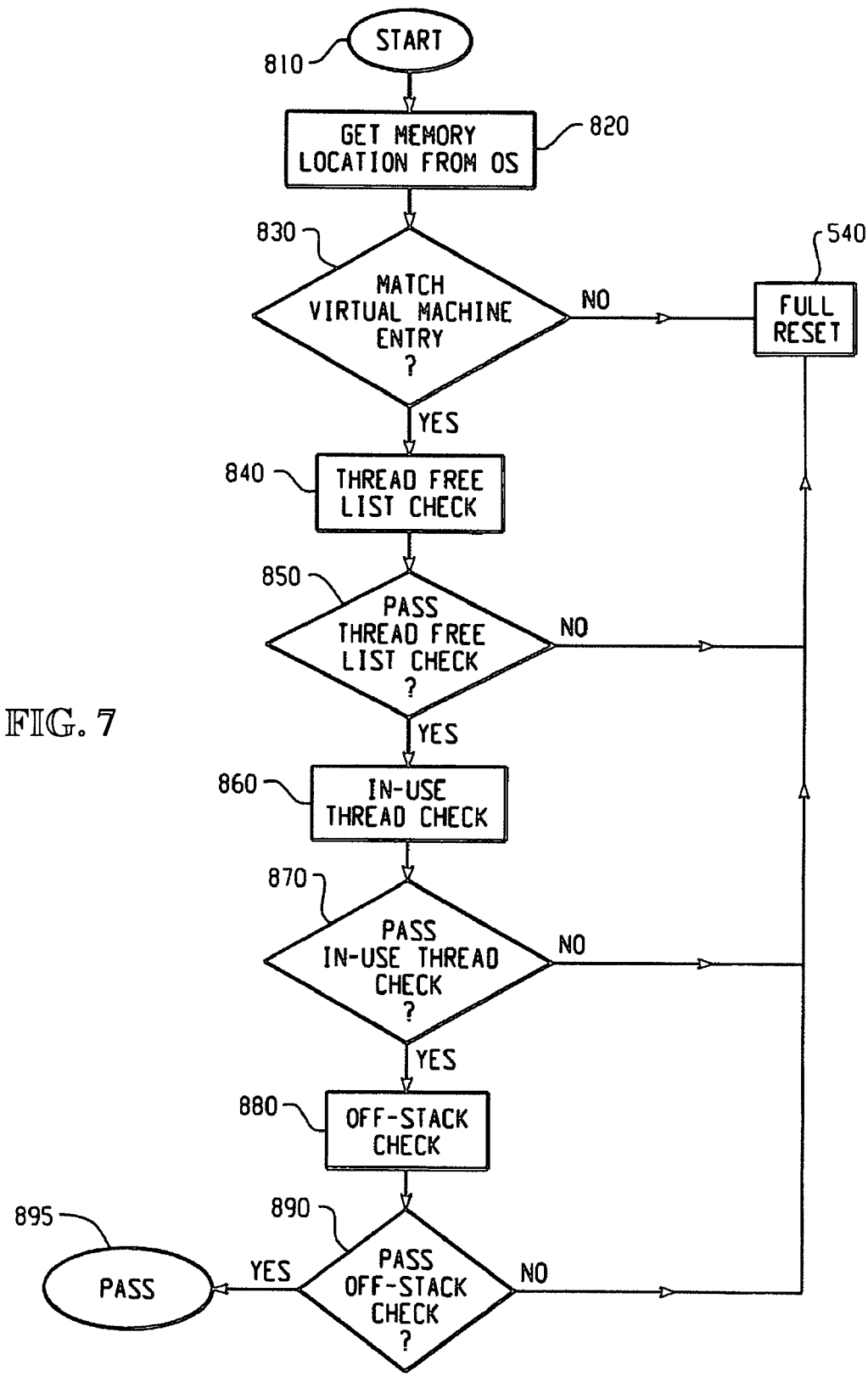
FIG. 7 is a flowchart depicting an example procedure to validate the contents of data structures in a virtual machine.

FIG. 7 is a flowchart depicting a consistency check, if needed, for the contents of the IRAM 316. Processing begins at start block 810 and continues at process block 820. At process block 820, the locations of the beginning and ending addresses of the IRAM 316 are obtained by querying the operating system 320 of the mobile device 100. At decision block 830, the addresses obtained at process block 820 are compared to the IRAM addresses stored by the virtual machine 340. If the addresses do not match, processing continues with a full system reset of the mobile device 100 at process block 540. If the addresses match, processing continues at process block 840 with a check of a thread free list of the virtual machine 340. This thread free list is a list of threads of the virtual machine 340 that were not in use at the time the error state indication 420 was detected. The thread free list check includes comparisons or examinations, based upon information from the virtual machine 340, to verify that threads listed as free by the virtual machine 340 are in fact free and point to another free thread.

The free thread list may also be examined to verify that memory addresses for free threads are located within the memory space allocated to the IRAM 316. During these checks, as with previously described checks, a processing algorithm is used to ensure that processing does not stall because of an infinite loop or cycle. Decision block 850 examines the thread free list check performed at process block 840. Failure to satisfy conditions of the free thread check results in processing continuing with a full system reset at process block 540. Successful completion results in processing continuing at process block 860 with a check of in-use threads.

In-use thread checks by process block 860 include memory location checks similar to those performed for the free threads. Thread identifiers may also be checked to verify that all identifiers have been appropriately accounted-for by the virtual machine 340, including checks to verify that all thread identifiers are used, that no two threads have the same identifier, and that each thread is appropriately marked as either "free" or "in-use." Decision block 870 depicts the results of the determination made based upon processing in-use thread checks. Failure to satisfy conditions of the checks results in a full system reset at processing block 540 and successful completion allows processing to continue at process block 880.

Process block 880 depicts the processing of off-RAM checks. Off-RAM checks are examinations of information associated with memory locations allocated in the IRAM 316. The off-RAM checks include comparisons of information from locations in the IRAM 316 with information from the virtual machine 340 such as memory location ownership by threads and/or the size of memory space allocated to a thread. Also checked are the beginning and ending locations of memory allocations for threads and that the current position of the execution of a thread is within the beginning and ending positions of the thread's memory allocation. Decision block 890 depicts the results of a determination based on the processing of off-RAM checks. Failure to satisfy conditions of the checks results in a full system reset at processing block 540 and successful completion results in the termination of off-RAM checks at end block 895.

Figure 8:
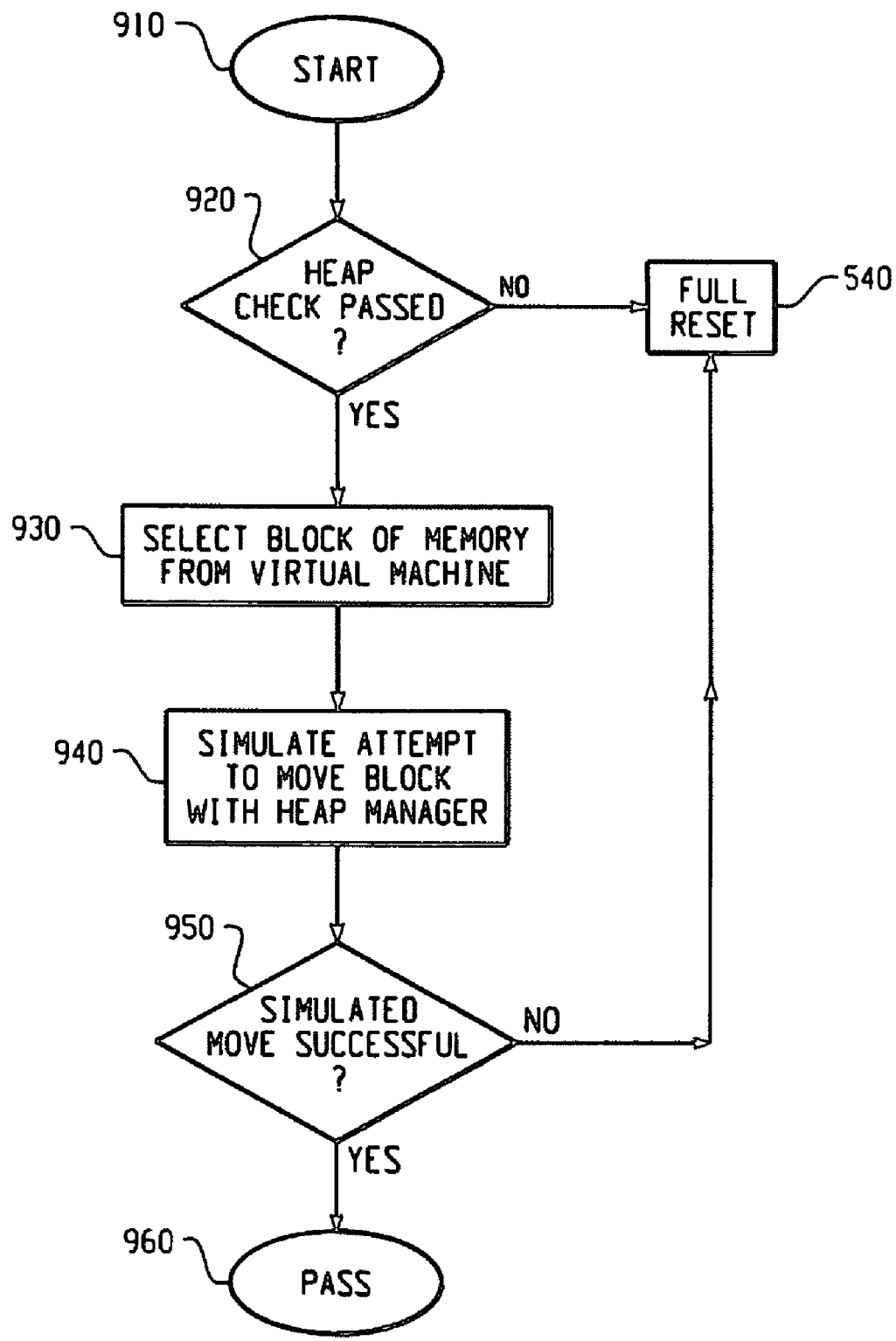
FIG. 8 is a flowchart depicting an example procedure to check the functionality of a virtual machine.

FIG. 8 is a flowchart depicting another check of a virtual machine. The virtual machine in this example includes a relocating heap manager. The relocating heap manager has the capability to access and move data so that free memory areas can be accumulated and formed into contiguous blocks. Processing begins at start block 910. Decision block 920 shows that in order for this check to proceed, a check of the heap, previously described, has to have passed. If a prior heap check has not been successful, a full system reset of the mobile device 100 is performed at process block 540. If a prior heap check was successful, processing occurs at process block 930 where a block of memory associated with or used by the virtual machine 340 is selected. At process block 940, an attempt to move a block of memory is simulated with the relocating heap manager. If a determination made at decision block 950 indicates that the simulated move was not successful, processing continues by performing a full system reset of the mobile device 100 at process block 540. If successful, processing of this step terminates at end block 960. This memory-move test may be performed a single time or repeated as many times as required.

Figure 9:
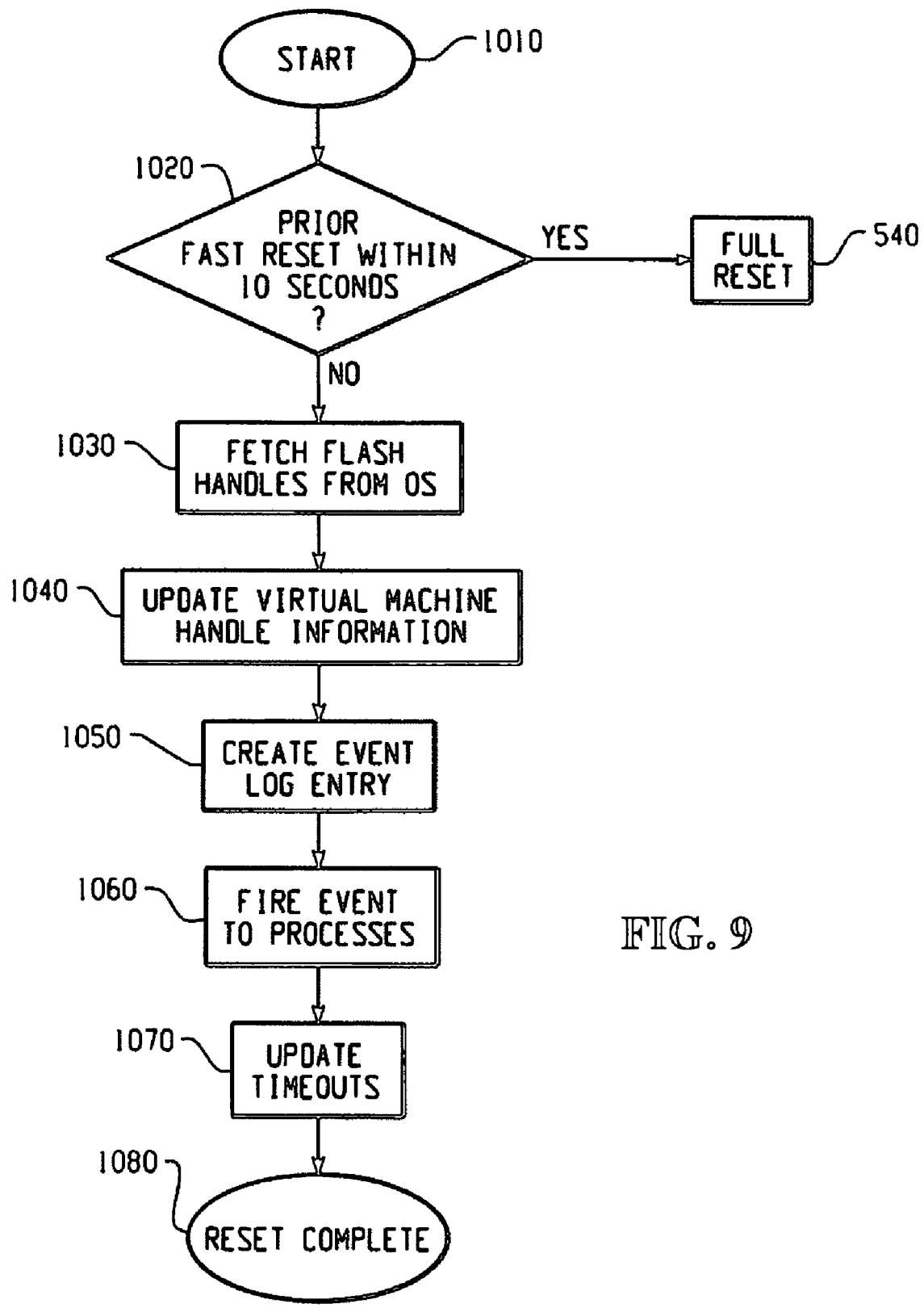
FIG. 9 is a flowchart depicting an example of post-validation processing.

FIG. 9 is a flowchart depicting post-testing operations performed upon the successful completion of prior validation checks. Processing begins at start block 1010 and continues at decision block 1020. At decision block 1020, a determination is made whether a prior fast reset procedure has been performed within a set time period. In the current example, that time period is ten (10) seconds. Other time periods may be chosen as appropriate for other specific implementations of the system and procedures described in this example. Time periods may be computed by checking log entries, by tracking processor cycles, clock ticks or another method of timekeeping in a computing environment. If a prior fast reset has occurred within the preceding 10 seconds, processing continues by performing a full system reset at process block 540. If more than the set period of time has elapsed since the last-occurring fast reset procedure, post-testing operations proceed at process block 1030 wherein a query is made of the operating system to obtain flash handle information from the operating system. Once the flash handle information has been obtained, processing continues at process block 1040 where the flash memory handle information of the virtual machine 340 is updated with the information obtained from the operating system 320. At process block 1050, a log entry for the fast reset process is created. Such log entries can be time stamped and used as a data source for the determination made in decision block 1020.

At process block 1060, an event is sent to the processes in the system to inform those processes that a fast reset has occurred. In this discussed example, the detection of the error state indication 420 began a process that effectively attempts to determine with some level of confidence whether data in the memory areas of the mobile device 100 has been corrupted and can be discarded or whether that data is valid and can be used for further processing. The checks described in this example may be performed in conjunction to provide increasing levels of confidence that such data is valid by checking known attributes of the data or metadata and performing appropriate comparisons. In this example, there remains a possibility that all checks could be successful but that data corruption or other problems remain and are undetected. The determination made at decision block 1020 prevents the mobile device 100 from engaging in an infinite loop of fast reset procedures.

As the operation of the mobile device 100 resumes following a fast reset, the execution of threads and other processes can be adjusted to account for the occurrence of a fast reset. For example, the execution of a thread may have been suspended while it awaited some event that a fast reset has prevented. The event sent at process block 1060 informs threads that any awaited event will not occur and that initiating requests should be resent. At process block 1070, timeout values for threads are adjusted to take the effects of a fast reset into account. The fast reset process is complete at end block 1080.

The above-described systems and methods described herein are intended to be examples only. Those of skill in the art may effect alterations, modifications and variations to the particular embodiments without departing from the scope of the invention which is defined by claims. For example, data signals transmitted using a communication channel may be used with the systems and methods. The data signals can include any type of data or voice information, such as an encoded message provided to a mobile device. The data signal may be packetized data that is transmitted through a carrier wave across the network. Still further computer-readable media may be used that is capable of causing a mobile device to perform the methods disclosed herein.

It should be understood that the checking processes may include one or multiple of the checks described herein and could include other checks, such as if a reference array is used to manage objects in memory, then checks of the reference array could be used. This type of check could use information about objects in memory obtained from the reference array and compare it with information about objects obtained from memory locations in the RAM 312, the nonvolatile memory 314, or the IRAM 316. Any inconsistencies noted during the check could be used to determine whether a full or fast reset is warranted.

The fast reset process discussed in the examples provides different approaches to validating the data contents of a mobile device. Each approach can be independent of each other approach. By combining approaches, a higher level of confidence that data has not been corrupted can be achieved than what is possible through the use of a single approach alone. However, it is within the scope of this disclosure that an implementation of the fast reset process may use only a single approach.

Figure 10:
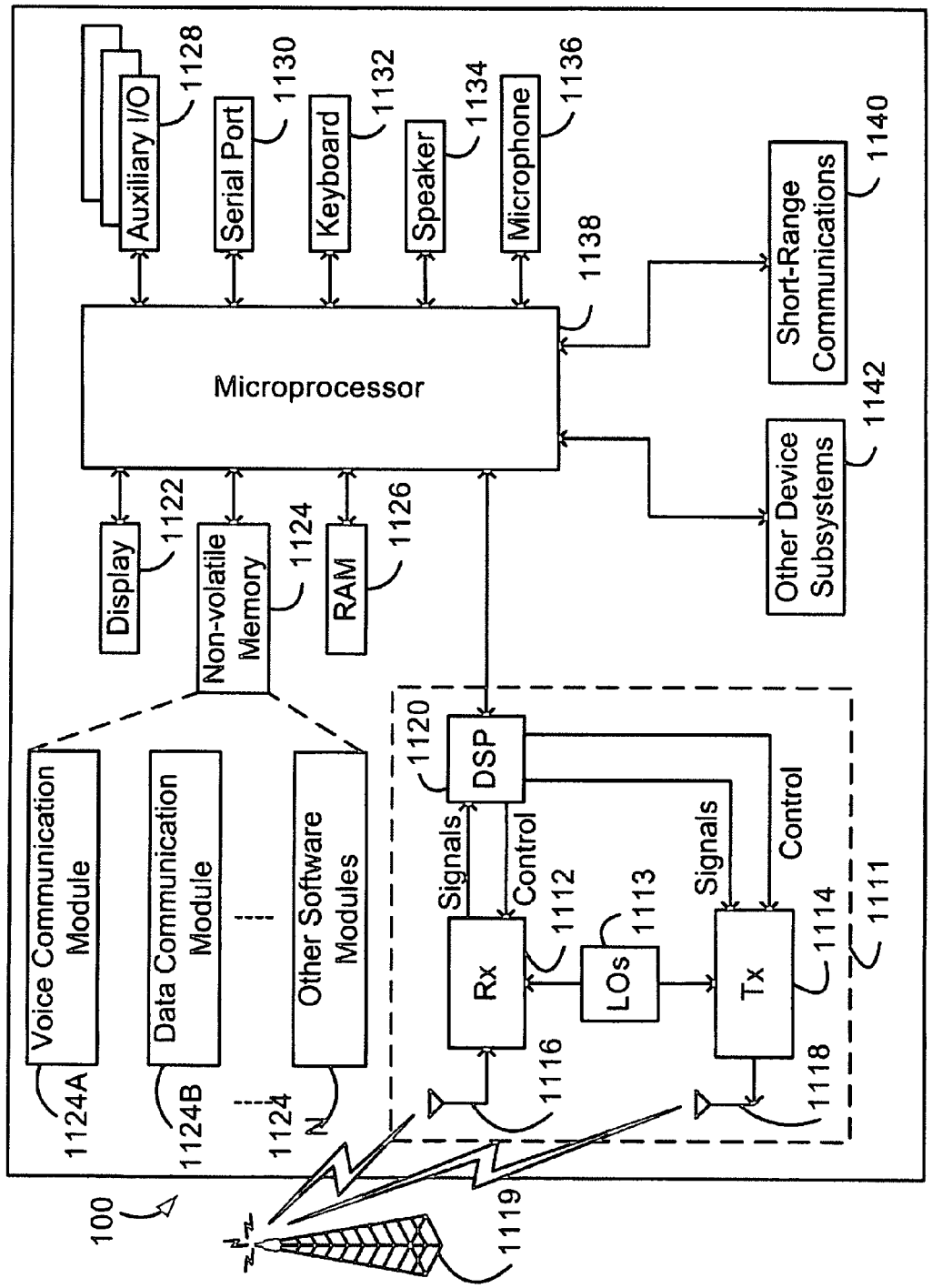
FIG. 10 is a block diagram of an example mobile device.

As another example, the systems and methods disclosed herein may be used with many different types of mobile devices. FIG. 10 is a block diagram of a wireless mobile communication device as an example of such a mobile device. In FIG. 10, a wireless mobile communication device 1100 is depicted as a dual-mode mobile device. The term dual-mode refers to the ability of the wireless mobile communication device 1100 to handle voice and data communications. Wireless mobile communication device 1100 includes a transceiver 1111, a microprocessor 1138, a display 1122, nonvolatile memory 1124, random access memory (RAM) 1126, intelligent RAM (IRAM) 1127, one or more auxiliary input/output (I/O) devices 1128, a serial port 1130, a keyboard 1132, a speaker 1134, a microphone 1136, a short-range wireless communications sub-system 1140, and other device sub-systems 1142.

The transceiver 1111 includes a receiver 1112, a transmitter 1114, antennas 1116 and 1118, one or more local oscillators 1113, and a digital signal processor (DSP) 1120. The antennas 1116 and 1118 may be antenna elements of a multiple-element antenna, and are preferably embedded antennas. However, the systems and methods described herein are in no way restricted to a particular type of antenna, or even to wireless communication devices.

The mobile device 1100 is preferably a two-way communication device having voice and data communication capabilities. Thus, for example, the mobile device 1100 may communicate over a voice network, such as any of the analog or digital cellular networks, and may also communicate over a data network. The voice and data networks are depicted by a communication tower 1119. These voice and data networks may be separate communication networks using separate infrastructure, such as base stations, network controllers, etc., or they may be integrated into a single wireless network.

The DSP 1120 is used to send and receive signals and control information to and from the receiver 1112 and the transmitter 1114. If the voice and data communications occur at a single frequency, or closely-spaced sets of frequencies, then a single local oscillator 1113 may be used in conjunction with the receiver 1112 and the transmitter 1114. Alternatively, if different frequencies are utilized for voice communications versus data communications for example, then a plurality of local oscillators 1113 can be used to generate a plurality of frequencies corresponding to the voice and data networks 1119. Information, which includes both voice and data information, is communicated to and from the transceiver 1111 via a link between the DSP 1120 and the microprocessor 1138.

The detailed design of the transceiver 11134, such as frequency band, component selection, power level, etc., will be dependent upon the communication network 1119 in which the mobile device 1100 is intended to operate. For example, a mobile device 1100 intended to operate in a North American market may include a transceiver 1111 designed to operate with any of a variety of voice communication networks, such as the Mobitex or DataTAC mobile data communication networks, AMPS, TDMA, CDMA, PCS, etc. A mobile device 1100 intended for use in Europe may be configured to operate with the GPRS data communication network and the GSM voice communication network. Other types of data and voice networks, both separate and integrated, may also be utilized with a mobile device 1100.

Depending upon the type of network or networks 1119, the access requirements for the mobile device 1100 may also vary. For example, in the Mobitex and DataTAC data networks, mobile devices are registered on the network using a unique identification number associated with each mobile device. In GPRS data networks, however, network access is associated with a subscriber or user of a mobile device. A GPRS device typically requires a subscriber identity module ("SIM"), which is required in order to operate a mobile device on a GPRS network. Local or non-network communication functions (if any) may be operable, without the SIM device, but a mobile device will usually be unable to carry out any functions involving communications over the data network 1119, other than any legally required operations, such as '911' emergency calling.

After any required network registration or activation procedures have been completed, the mobile device 1100 may the send and receive communication signals, including both voice and data signals, over the networks 1119. Signals received by the antenna 1118 from the communication network 1119 are routed to the receiver 1112, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 1120. In a similar manner, signals to be transmitted to the network 1119 are processed, including modulation and encoding, for example, by the DSP 1120 and are then provided to the transmitter 1114 for digital to analog conversion, frequency up conversion, filtering, amplification and transmission to the communication network 1119 via the antenna 1116.

In addition to processing the communication signals, the DSP 1120 also provides for transceiver control. For example, the gain levels applied to communication signals in the receiver 1112 and the transmitter 1114 may be adaptively controlled through automatic gain control algorithms implemented in the DSP 1120. Other transceiver control algorithms could also be implemented in the DSP 1120 in order to provide more sophisticated control of the transceiver 1111.

The microprocessor 1138 preferably manages and controls the overall operation of the mobile device 1100. Many types of microprocessors or microcontrollers could be used here, or, alternatively, a single DSP 1120 could be used to carry out the functions of the microprocessor 1138. Low-level communication functions, including at least data and voice communications, are performed through the DSP 1120 in the transceiver 1111. Other, high-level communication applications, such as a voice communication application 1124A, a data communication application 1124B, and other software modules 1124N may be stored in the nonvolatile memory 1124 for execution by the microprocessor 1138. For example, the voice communication module 1124A may provide a high-level user interface operable to transmit and receive voice calls between the mobile device 1100 and a plurality of other voice or dual-mode devices via the network 1119. Similarly, the data communication module 1124B may provide a high-level user interface operable for sending and receiving data, such as e-mail messages, files, organizer information, short text messages, etc., between the mobile device 1100 and a plurality of other data devices via the networks 1119.

The microprocessor 1138 also interacts with other device subsystems, such as the display 11322, the RAM 1126, the IRAM 1127, the auxiliary input/output (I/O) subsystems 1128, the serial port 1130, the keyboard 1132, the speaker 1134, the microphone 1136, the short-range communications subsystem 1124A and any other device subsystems generally designated as 1142.

Some of the subsystems shown in FIG. 10 perform communication-related functions, whereas other subsystems may provide "resident" or on-device functions. Notably, some subsystems, such as the display 1122 and the keyboard 1132 may be used for both communication-related functions, such as entering a text message for transmission over a data communication network, and device-resident functions such as a calculator or task list or other personal data assistant (PDA) type functions.

Operating system software used by the microprocessor 1138 is preferably stored in a persistent store such as nonvolatile memory 1124. The nonvolatile memory 1124 may be implemented, for example, as a Flash memory component, or as battery backed-up RAM. In addition to the operating system, which controls low-level functions of the mobile device 1100, the nonvolatile memory 1124 includes a plurality of software modules 1124A-1124N that can be executed by the microprocessor 1138 (and/or the DSP 1120), including a voice communication module 1124A, a data communication module 1124B, and a plurality of other operational modules 1124N for carrying out a plurality of other functions. These modules are executed by the microprocessor 1138 and provide a high-level interface between a user and the mobile device 1100. This interface typically includes a graphical component provided through the display 1122, and an input/output component provided through the auxiliary I/O 1128, keyboard 1132, speaker 1134, and microphone 1136. The operating system, specific device applications or modules, or parts thereof, may be temporarily loaded into a volatile store, such as RAM 1126 for faster operation. Moreover, received communication signals may also be temporarily stored in RAM 1126, before permanently writing them to a file system located in a persistent store such as the nonvolatile memory 1124.

An exemplary application software module 1124N that may be loaded onto the mobile device 1100 is a personal information manager (PIM) application providing PDA functionality, such as calendar events, appointments, and task items. This software module 1124N may also interact with the voice communication module 1124A for managing phone calls, voice mails, etc., and may also interact with the data communication module for managing e-mail communications and other data transmissions. Alternatively, all of the functionality of the voice communication module 1124A and the data communication module 1124B may be integrated into the PIM module.

The nonvolatile memory 1124 preferably also includes a file system to facilitate storage of PIM data items on the device. The PIM application preferably includes the ability to send and receive data items, either by itself, or in conjunction with the voice and data communication modules 1124A, 1124B, via the wireless networks 1119. The PIM data items are preferably seamlessly integrated, synchronized and updated, via the wireless networks 1119, with a corresponding set of data items stored or associated with a host computer system, thereby creating a mirrored system for data items associated with a particular user.

Context objects representing at least partially decoded data items, as well as fully decoded data items, are preferably stored on the mobile device 1100 in a volatile and non-persistent store such as the RAM 1126. Such information may instead be stored in the nonvolatile memory 1124, for example, when storage intervals are relatively short, such that the information is removed from memory soon after it is stored. However, storage of this information in the RAM 1126 or another volatile and non-persistent store, such as IRAM 1127, is preferred, in order to ensure that the information is erased from memory when the mobile device 1100 loses power. This information loss prevents an unauthorized party from obtaining any stored decoded or partially decoded information by removing a memory chip from the mobile device 1100, for example.

The mobile device 1100 may be manually synchronized with a host system by placing the mobile device 1100 in an interface cradle, which couples the serial port 1130 of the mobile device 1100 to the serial port of a computer system or device. The serial port 1130 may also be used to enable a user to set preferences through an external device or software application, or to download other application modules 1124N for installation. This wired download path may be used to load an encryption key onto the device, which is a more secure method than exchanging encryption information via the wireless network 1119. Interfaces for other wired download paths may be provided in the mobile device 1100, in addition to or instead of the serial port 1130. For example, a USB or FireWire™ (IEEE 1394) port would provide an interface to a similarly equipped personal computer.

Additional application modules 1124N may be loaded onto the mobile device 1100 through the networks 1119, through an auxiliary I/O subsystem 1128, through the serial port 1130, through the short-range communications subsystem 1140, or through any other suitable subsystem 1142, and installed by a user in the nonvolatile memory 1124, RAM 1126, or IRAM 1127. Such flexibility in application installation increases the functionality of the mobile device 1100 and may provide enhanced on-device functions, communication-related functions, or both. For example, secure communication applications may enable electronic commerce functions and other such financial transactions to be performed using the mobile device 1100.

When the mobile device 1100 is operating in a data communication mode, a received signal, such as a text message or a web page download, is processed by the transceiver module 1111 and provided to the microprocessor 1138, which preferably further processes the received signal in multiple stages as described above, for eventual output to the display 1122, or, alternatively, to an auxiliary I/O device 1128. A user of the mobile device 1100 may also compose data items, such as e-mail messages, using the keyboard 1132, which is preferably a complete alphanumeric keyboard laid out in the QWERTY style, although other styles of complete alphanumeric keyboards such as the DVORAK style may also be used. User input to the mobile device 1100 is further enhanced with a plurality of auxiliary I/O devices 1128, which may include a thumbwheel input device, a touchpad, a variety of switches, a rocker input switch, etc. The composed data items input by the user may then be transmitted over the communication networks 1119 via the transceiver module 1111.

When the mobile device 1100 is operating in a voice communication mode, the overall operation of the mobile device is substantially similar to the data mode, except that received signals are preferably be output to the speaker 1134 and voice signals for transmission are generated by a microphone 1136. Alternative voice or audio I/O subsystems, such as a voice message recording subsystem, may also be implemented on the mobile device 1100. Although voice or audio signal output is preferably accomplished primarily through the speaker 1134, the display 1122 may also be used to provide an indication of the identity of a calling party, the duration of a voice call, or other voice call related information. For example, the microprocessor 1138, in conjunction with the voice communication module and the operating system software, may detect the caller identification information of an incoming voice call and display it on the display 11322.

A short-range communications subsystem 1124A is also included in the mobile device 1100. The short-range communications subsystem 1124A may include an infrared device and associated circuits and components, or a short-range RF communication module such as a Bluetooth™ module or an 802.11 (WiFi) module, for example, to provide for communication with similarly-enabled systems and devices. Those skilled in the art will appreciate that Bluetooth, 802.11, and WiFi refer to specifications, or sets of specifications, available from the Institute of Electrical and Electronics Engineers (IEEE), relating to wireless personal area networks and wireless local area networks, respectively.

Figure 11:
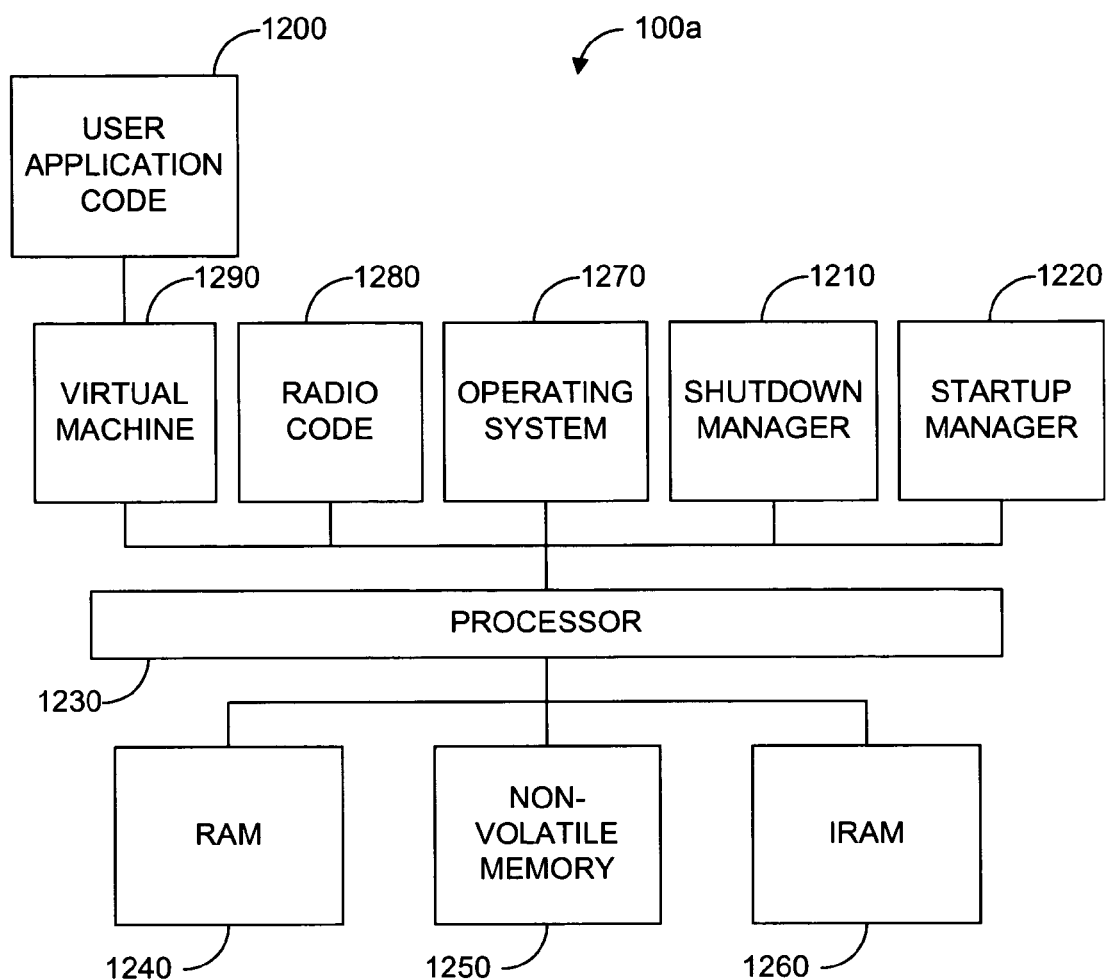
FIG. 11 is a block diagram depicting application code configured to operate on a mobile device.

Either separately/independently from or in conjunction with one or more of the operations and components discussed above, a mobile device can be configured as shown in FIG. 11 in order to improve operations associated with startup and/or shutdown of a mobile device. FIG. 11 depicts application code (e.g., user application code 1200) operating on a mobile device 100a that contains a shutdown manager 1210 and a startup manager 1220. A mobile device 100a includes a microprocessor 1230 which is coupled (e.g., has a direct/indirect data communication pathway) to RAM 1240 and nonvolatile memory 1250. Mobile device 100a could also have other memory devices, such as intelligent random access memory (IRAM) 1260. Examples of nonvolatile memory 1250 are a Flash memory device, a magnetic RAM, a magnetic disk drive, a tape drive, etc.

Microprocessor 1230 executes various software routines, including an operating system 1270, a radio code module 1280, and a virtual machine 1290. Additionally, one or more user application modules 1200 may execute on the virtual machine 1290. The user application modules 1200 may include such applications as electronic mail (e-mail) clients, scheduling applications, text entry, or other applications that can allow a user to create, send, receive, or manipulate electronic data.

Mobile device 100a can be configured to handle software operations associated with a shutdown and/or startup of the mobile device 100a. Shutdown manager 1210 can be used to receive notification of a shutdown on the mobile device. Shutdown manager 1210 can then notify one or more applications (e.g., user application code 1200 or the virtual machine 1290) of the impending shutdown and can assign nonvolatile memory (e.g., memory 1250) to the application. The shutdown manager 1210 can retain power until an application has its volatile memory contents (e.g., data used by the application during the application's execution) transferred to the assigned memory block. Startup manager 1220 can transfer the stored volatile memory contents back to volatile memory for use by the application (e.g., during the application's execution) based upon the mobile device 100a receiving a startup request.

FIG. 11 depicts certain components of a possible architecture and does not depict all components that may be included in such architecture. For example, architectures for mobile devices can vary based upon the desire to implement certain functional features, such as making a mobile device capable of handling both voice and data communications. The fact that other components are not depicted in the figures or discussed is in no way intended to limit the systems and methods disclosed herein or imply that other components cannot be included or the components shown cannot be excluded as part of the architecture of the example systems and methods. Correspondingly, one or more methods and systems disclosed herein may operate with fewer components than what is depicted in FIG. 11 depending upon the functionality needed for the application at hand. As an illustration, user application code 1200 may not require a virtual machine 1290 in certain computing environments.

Figure 12:
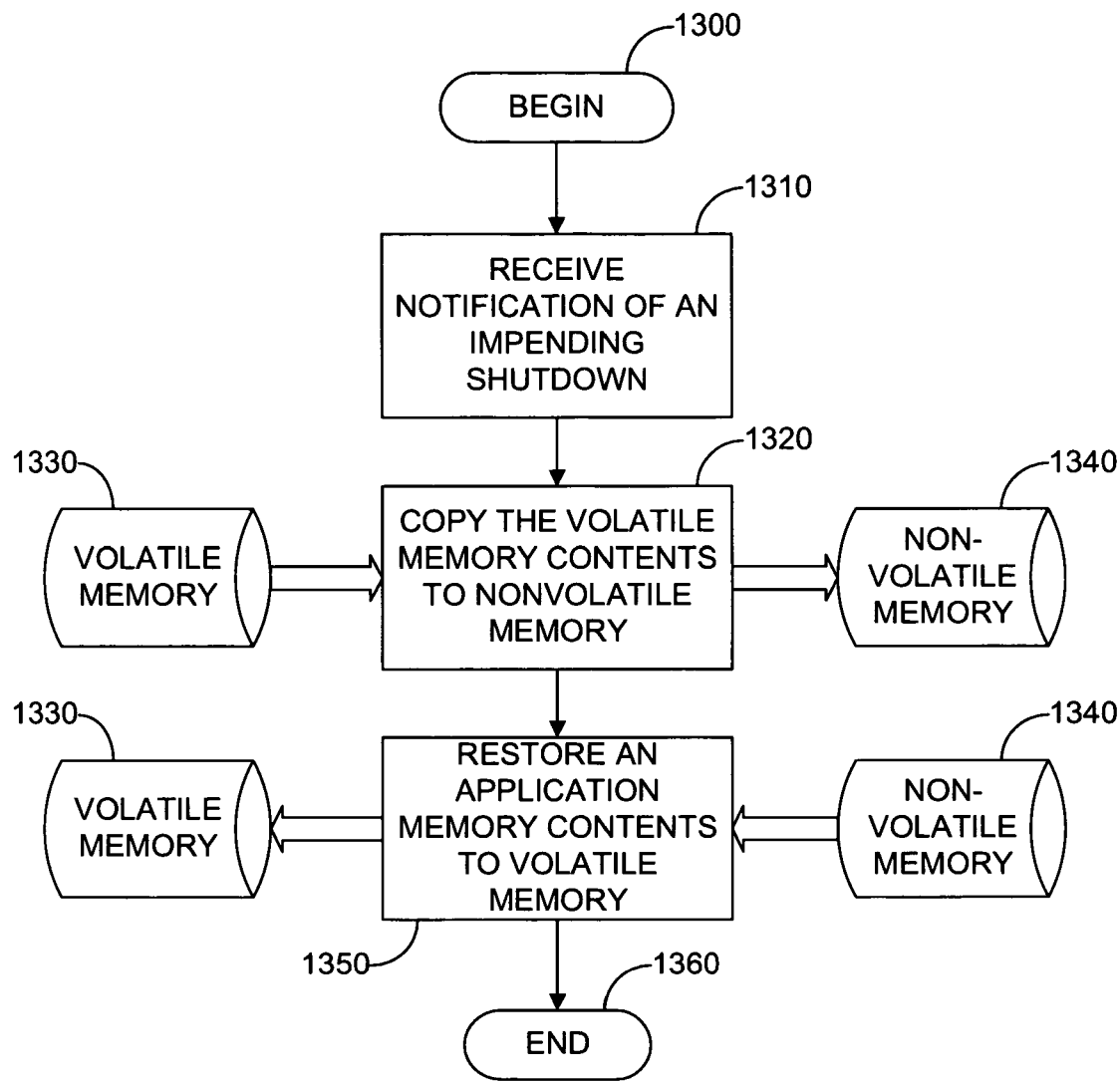
FIG. 12 is a flowchart illustrating an operational scenario for shutdown and startup of a mobile device.

Startup and/or shutdown operations can be configured in many different ways, such as the approach illustrated in FIG. 12. FIG. 12 depicts an operational scenario of a mobile device that begins at step 1300. At process block 1310 the mobile device receives notification of an impending shutdown. The shutdown notification can come from a user via a user interface or from other sources, such as the mobile device being idle for a predetermined amount of time. Based on the impending shutdown, the mobile device copies the contents of the volatile memory 1330 into nonvolatile memory 1340, as shown in process block 1320. It should be understood that the nonvolatile memory of the present disclosure can include battery-powered RAM having write functionality disabled/enabled through the use of a read-only pin of the RAM as is known to a person having ordinary skill in the art, as well as other examples such as flash memory, a magnetic RAM, a magnetic disk drive, a tape drive, or the like. Preferably, nonvolatile memory is nonvolatile RAM (NVRAM), a kind of memory that retains data when the device is turned off or there is a power failure. A battery within the device powers NVRAM. A nonvolatile memory can also work by writing its contents to and restoring them from an EEPROM. Upon copying the volatile memory contents to nonvolatile memory, the mobile device may complete shutdown. However, it should be noted that the user may continue to have the option of restoring power to the mobile device at any time. Furthermore, in the event that powered RAM is used, it should be recognized that the volatile memory contents are not necessarily copied to another location, but can remain in the same location in which they would be found during normal execution of the application. As such, in one example of the disclosure, the copy step could be eliminated from the operational scenario described above.

Upon restoration of power to the mobile device, the mobile device restores the memory contents associated with an application to volatile memory 1330 as shown in process block 1350. Restoring the memory contents associated with the application involves copying the non-volatile memory 1340 contents into the volatile memory 1330. The application may then continue execution at the same point it was at when the mobile device received the shutdown request. The process ends at termination block 1360, however, it should be noted that the mobile device can continue to execute the application after completing the operational scenario outlined above.

Figure 13:
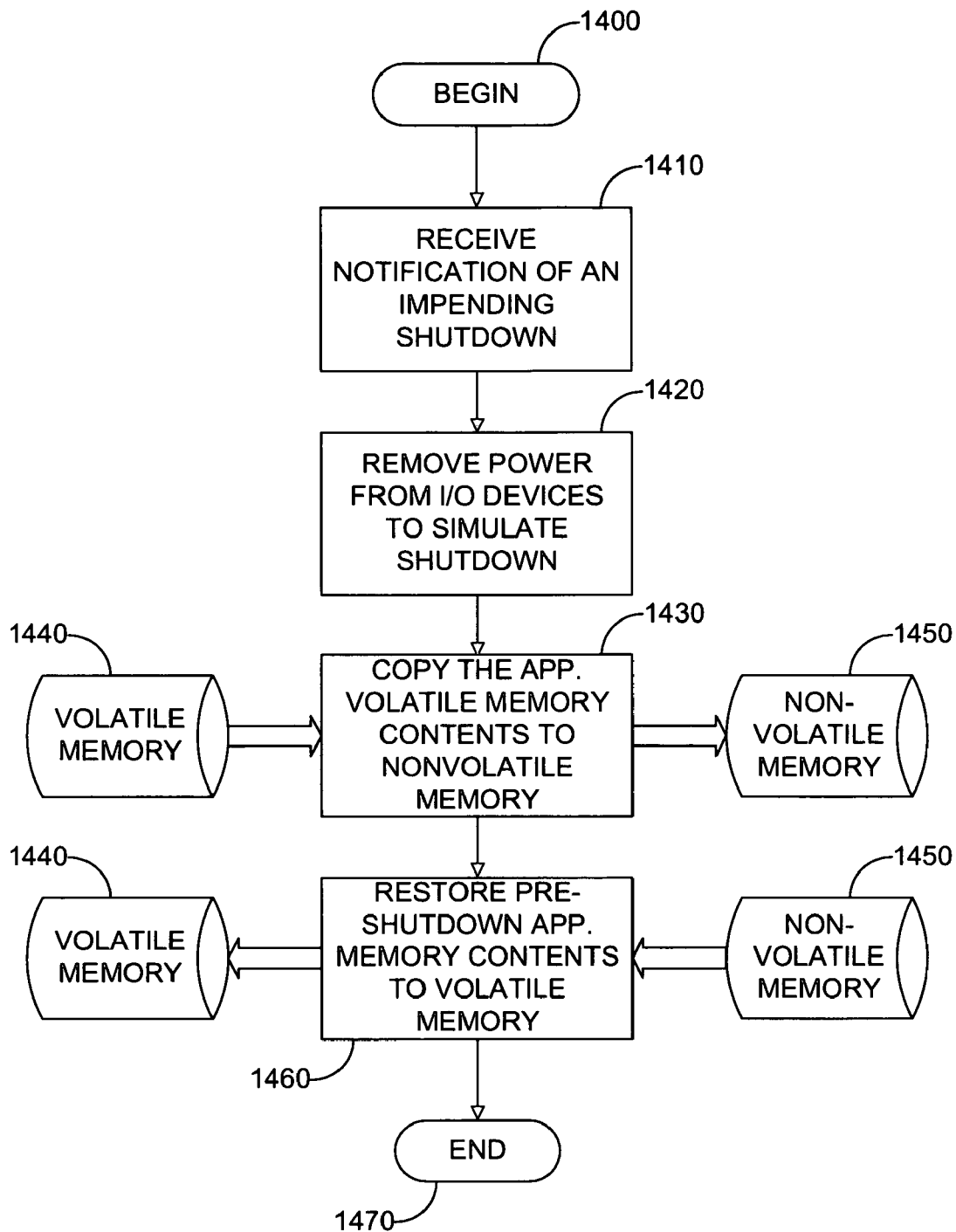
FIG. 13 is a flowchart illustrating an operational scenario for shutdown and startup of a mobile device configured to simulate a shutdown while storing volatile memory contents.

FIG. 13 depicts another operational scenario of the mobile device. The operational scenario begins at process block 1400. The operational scenario continues at process block 1410 when the mobile device receives a shutdown request from the user. In response to the shutdown request, the mobile device can remove power from as many input/output (I/O) devices as possible, such that the device appears to a user to be in shutdown (e.g., the termination of all operations), as shown by process block 1420. The I/O devices can include, for example, user interface devices, such as the display, the keyboard, the speaker, the microphone, light emitting diodes (LEDs), etc., as well as other I/O, such as, the radio, etc. It should be noted, however, that the power on/off switch can continue to be operable. Furthermore, the mobile device can remove power to any other devices/processes which are not used during the operational scenario. It should be noted that the simulated shutdown described above can be implemented in any of the embodiments disclosed herein.

In process block 1430, the volatile memory contents 1440 associated with applications executing on the mobile device are copied to non-volatile memory 1450. Upon completion of the copy operations, the mobile device can remove power from the volatile memory, thereby erasing the contents of the volatile memory. Upon restoration of power, which can be requested by the user via a power on/off button, the mobile device restores the pre-shutdown application memory contents to the volatile memory 1440 by copying the non-volatile memory contents 1450 back into the volatile memory 1440, as shown in process block 1460. The process ends at termination block 1470, however, it should be noted that the mobile device continues to execute the application after completing the operational scenario outlined above.

Figure 14:
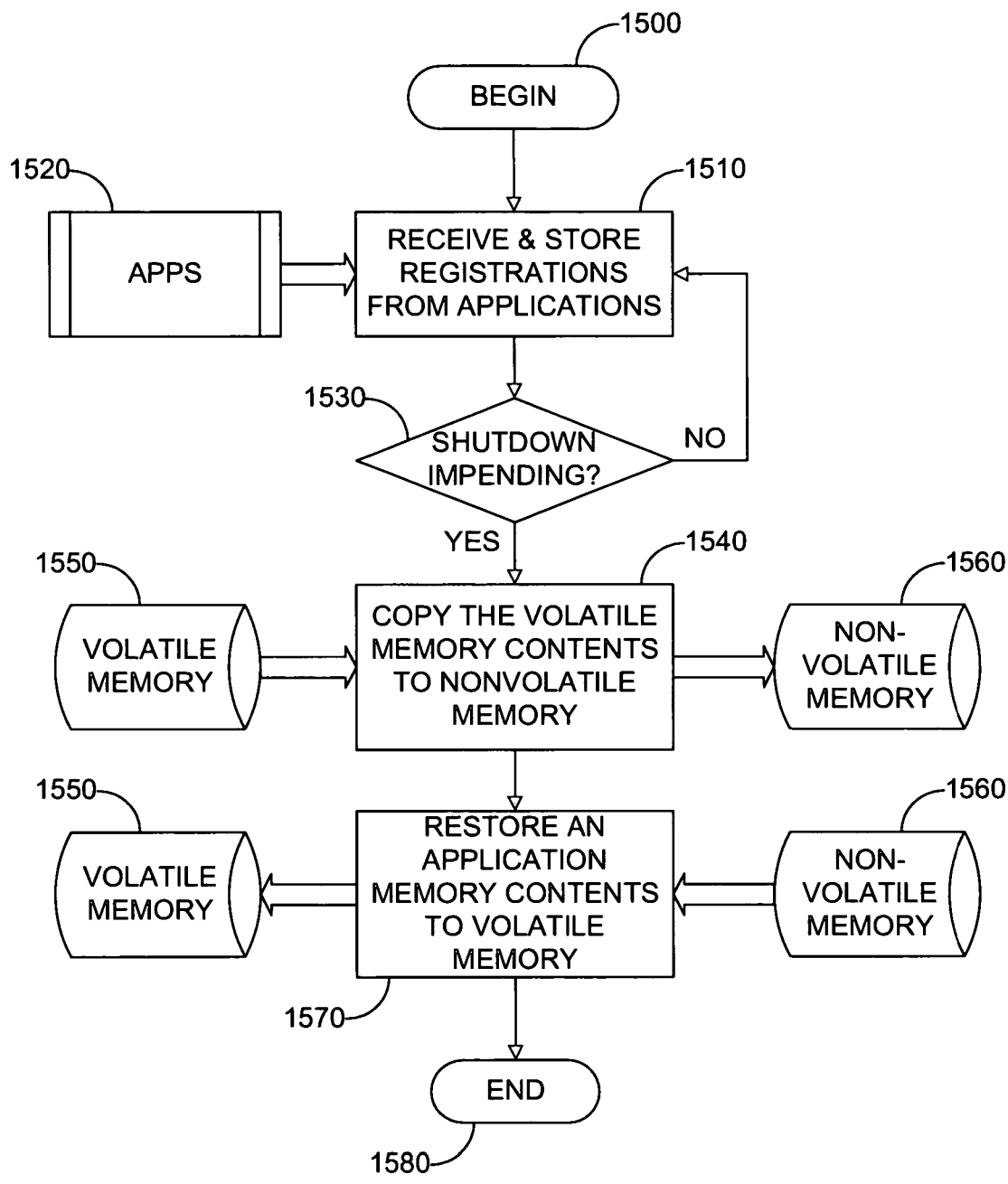
FIG. 14 is a flowchart illustrating an operational scenario for shutdown and startup of a mobile device configured to register applications to for storage of volatile memory contents.

FIG. 14 depicts another operational scenario of the mobile device. The operational scenario begins at process block 1500. At process block 1510, the mobile device receives and stores registrations from applications 1520. Registrations are used to do the following: determine which applications should be notified in case of a shutdown, assign nonvolatile memory space, and determine which applications can start jobs to transfer their volatile memory contents during the shutdown sequence. At decision block 1530 the mobile device determines whether an impending shutdown notification has been received from a user. If no impending shutdown notification has been received, the mobile device continues to receive and store notifications until the mobile device receives a shutdown notification.

Process block 1540 shows the volatile memory contents 1550 associated with the registered applications 1520 executing on the mobile device being copied into non-volatile memory 1560. Upon completion of the copying, the mobile device can remove power to the volatile memory 1550, thereby erasing the contents of the volatile memory 1550. Upon restoration of power, which can be requested by the user via a power on/off button, the mobile device can restore the pre-shutdown application memory contents to the volatile memory 1550 by copying the non-volatile memory contents 1560 back into the volatile memory 1550, as shown in process block 1570. The process ends at termination block 1580, however, it should be noted that the mobile device continues to execute the application after completing the operational scenario outlined above.

Figure 15:
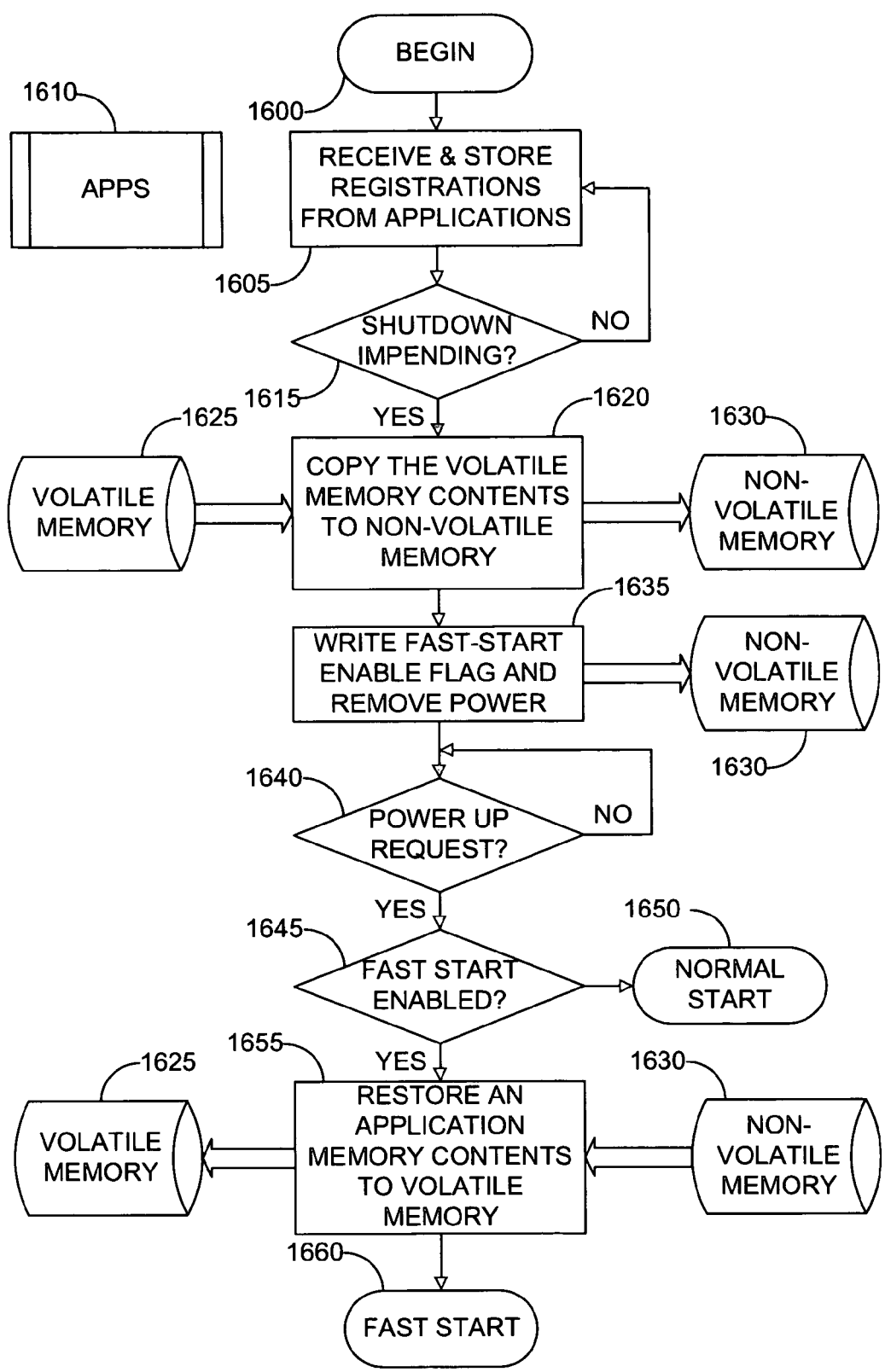
FIG. 15 is a flowchart illustrating an operational scenario for shutdown and startup of a mobile device configured to include a fast start flag.

FIG. 15 depicts yet another operational scenario of the mobile device. The operational scenario begins at process block 1600. At process block 1605, the mobile device receives and stores registrations from applications 1610. At decision block 1615 the mobile device determines whether an impending shutdown notification has been received from a user. If no impending shutdown notification has been received, the mobile device continues to receive and store notifications until the mobile device receives a shutdown notification.

Process block 1620 shows the volatile memory contents 1625 associated with the registered applications 1610 executing on the mobile device being copied into non-volatile memory 1630. Upon completion of the copying, the mobile device can remove power to the volatile memory 1625, thereby erasing the contents of the volatile memory 1625. In process block 1635, the mobile device writes a fast-start enable flag into non-volatile memory 1630, and removes power from the device, thereby erasing the volatile memory 1625. The fast-start enable flag could be a word written to a memory location. A longer fast-start enable flag could be used to enable the mobile device to recognize the likelihood that the non-volatile memory contains errors from the volatile memory transfer. However, it should be understood that the fast-start enable flag can be a flag of any length.

The mobile device can remain in a shutdown state until power is restored via a power up request, as shown by decision block 1640. Upon restoration of power, the mobile device checks the fast-start enable flag, as shown in decision block 1645, to determine whether the non-volatile memory includes memory contents that can copied into the volatile memory and used to restore the applications running on the mobile device. If the fast start enable flag does not match an enabling sequence, the mobile device can perform a normal startup, as shown in terminating block 1650.

If the fast start enable flag matches the enabling sequence for the fast-start, the mobile device restores the application memory contents to volatile memory, as shown in process block 1655. The pre-shutdown memory contents are restored by copying the contents from the nonvolatile memory 1630 into the volatile memory 1625 associated with the applications. The process ends at termination block 1660, however, it should be noted that the mobile device continues to execute the application after completing the operational scenario outlined above.

Figure 16A:
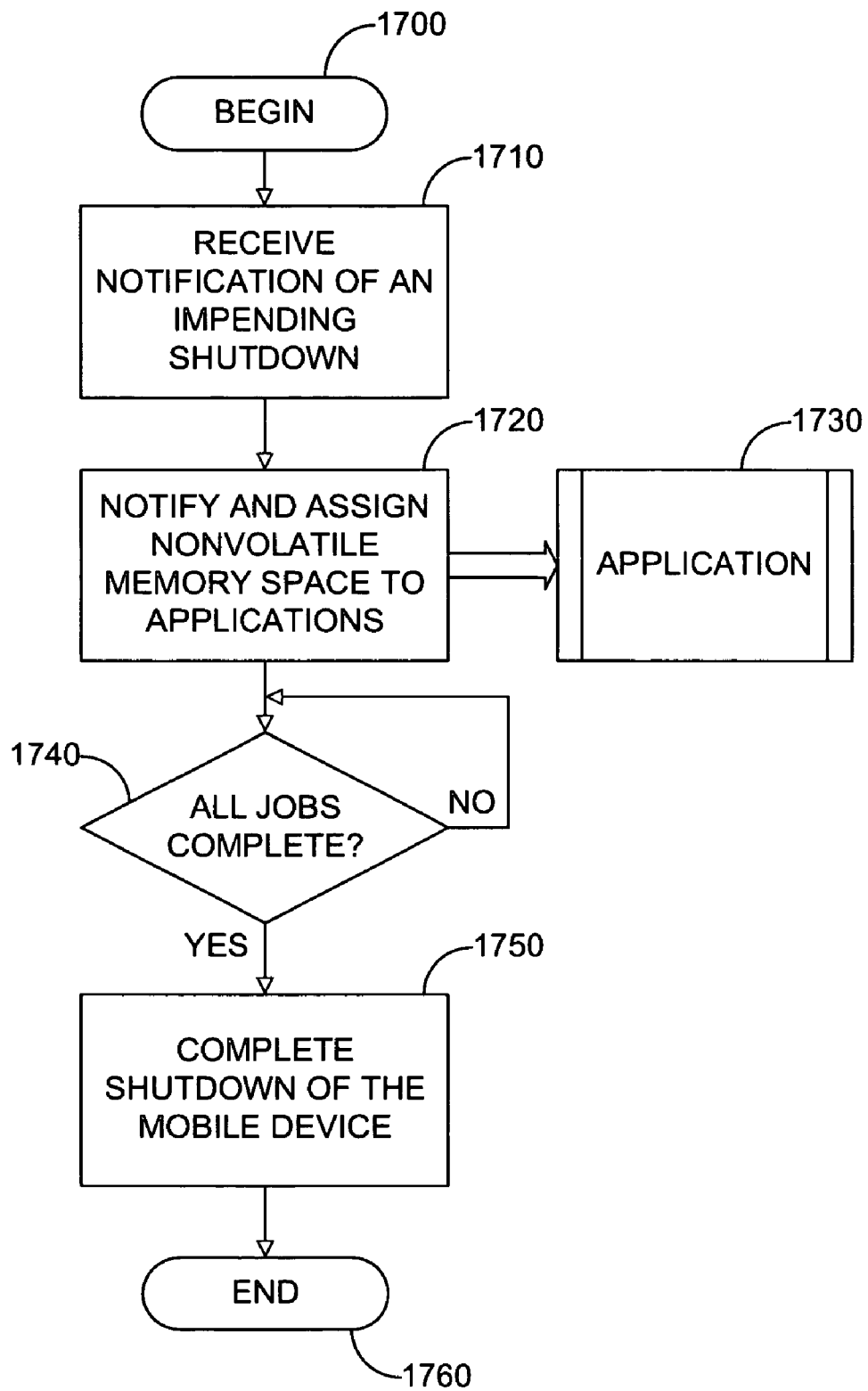
FIG. 16A is a flowchart illustrating an operational scenario for a shutdown manager of a mobile device.

FIG. 16A depicts an operational scenario associated with a shutdown manager on the mobile device. The process begins at block 1700, during which the mobile device can be executing normally. At process block 1710, a shutdown manager receives notification of an impending shutdown from the mobile device. The impending shutdown could be caused by a number of different factors, including, for example, a low battery, user initiated shutdown, etc.

At process block 1720, the shutdown manager alerts the applications 1730 of the impending shutdown and assigns nonvolatile memory space to each of the applications. The nonvolatile memory space is used to enable the applications to have the opportunity to store their volatile memory contents during shutdown of the mobile device. Moreover, the notification could allow the applications to complete current processing jobs (e.g., decompressing data, pre-initialing data, etc.). As shown in process block 1740, the shutdown manager then waits for the copy jobs to complete before proceeding.

Process block 1750 shows the shutdown manager completing shutdown of the mobile device. This can be done by removing power from the volatile memory and from the processor. Removing power from the volatile memory erases the contents of the volatile memory. It should be noted that nonvolatile memory contents are not affected during shutdown. The operational scenario ends at termination block 1760, at which point all operations by the device will have terminated.

Figure 16B:
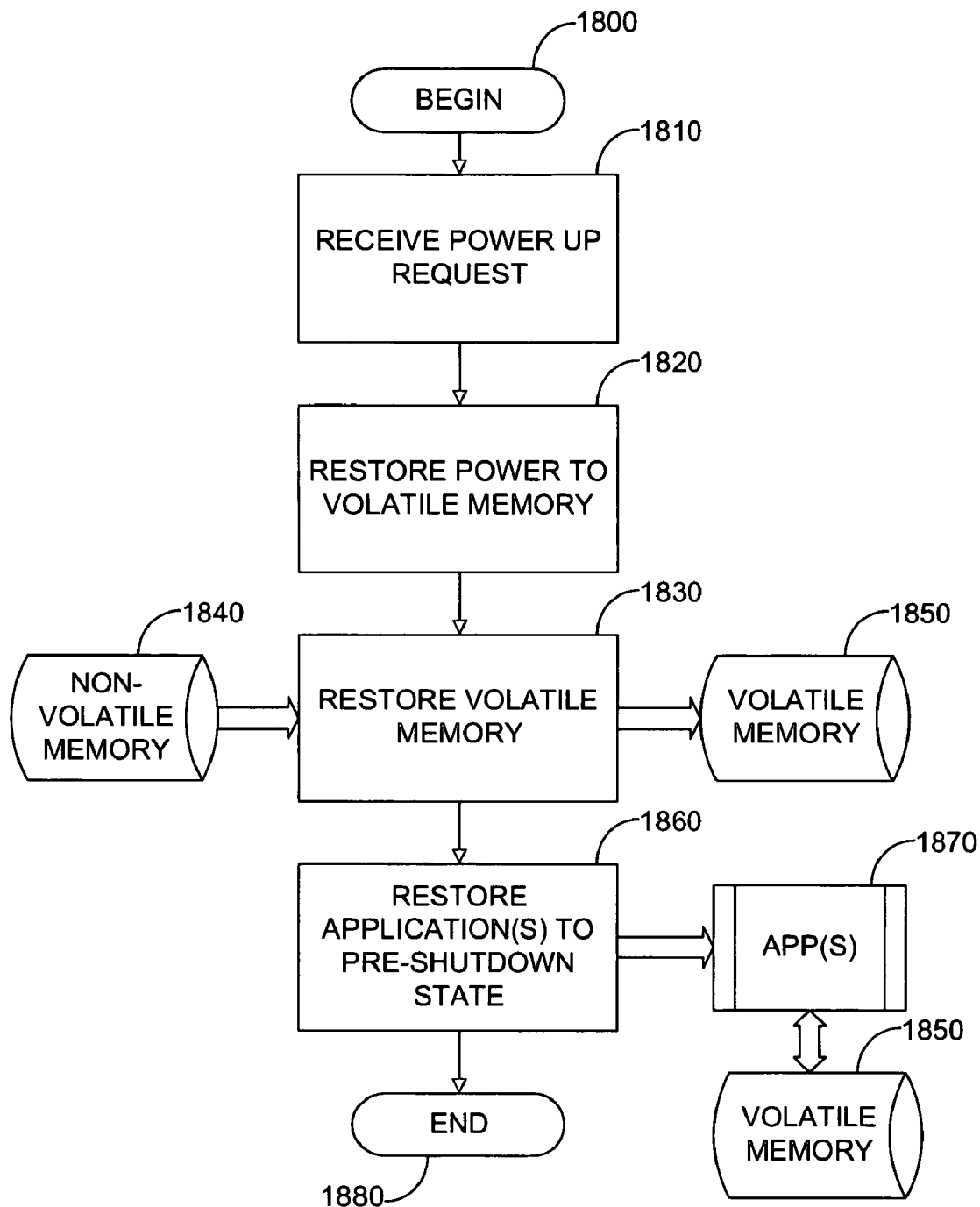
FIG. 16B is a flowchart illustrating an operational scenario for a startup manager of a mobile device.

FIG. 16B depicts an operational scenario associated with a startup manager on the mobile device. The process begins at block 1800, which could be a complete shutdown state of the mobile device. Alternatively, block 1800 could be during a shutdown operational scenario. As shown in process block 1810, the startup manager 1810 receives a power up request, which can come from the user. Process block 1820 shows the startup manager restoring power to the volatile memory, however, it should be understood that this step could be automatically completed by the mobile device on startup.

In process block 1830, the startup manager restores volatile memory 1850 of the device to the same state in which the volatile memory 1850 existed prior to the shutdown. The startup manager accomplishes this step by retrieving memory contents from the nonvolatile memory 1840, and copying those memory contents to the volatile memory 1850. It should be noted, that the startup manager can also perform a cleanup during transfer from nonvolatile memory 1840 to volatile memory 1850, by deleting the memory contents in nonvolatile memory 1840 that have been transferred to the volatile memory 1850.

Process block 1860 shows the startup manager restoring the application(s) 1870 on the mobile device to their pre-shutdown state, based upon the memory content being transferred to their associated volatile memory 1850. The operational scenario ends at termination block 1880. However, it should be noted that the mobile device continues to execute the application(s) 1870 after completing the operational scenario outlined above.

Figure 17A:
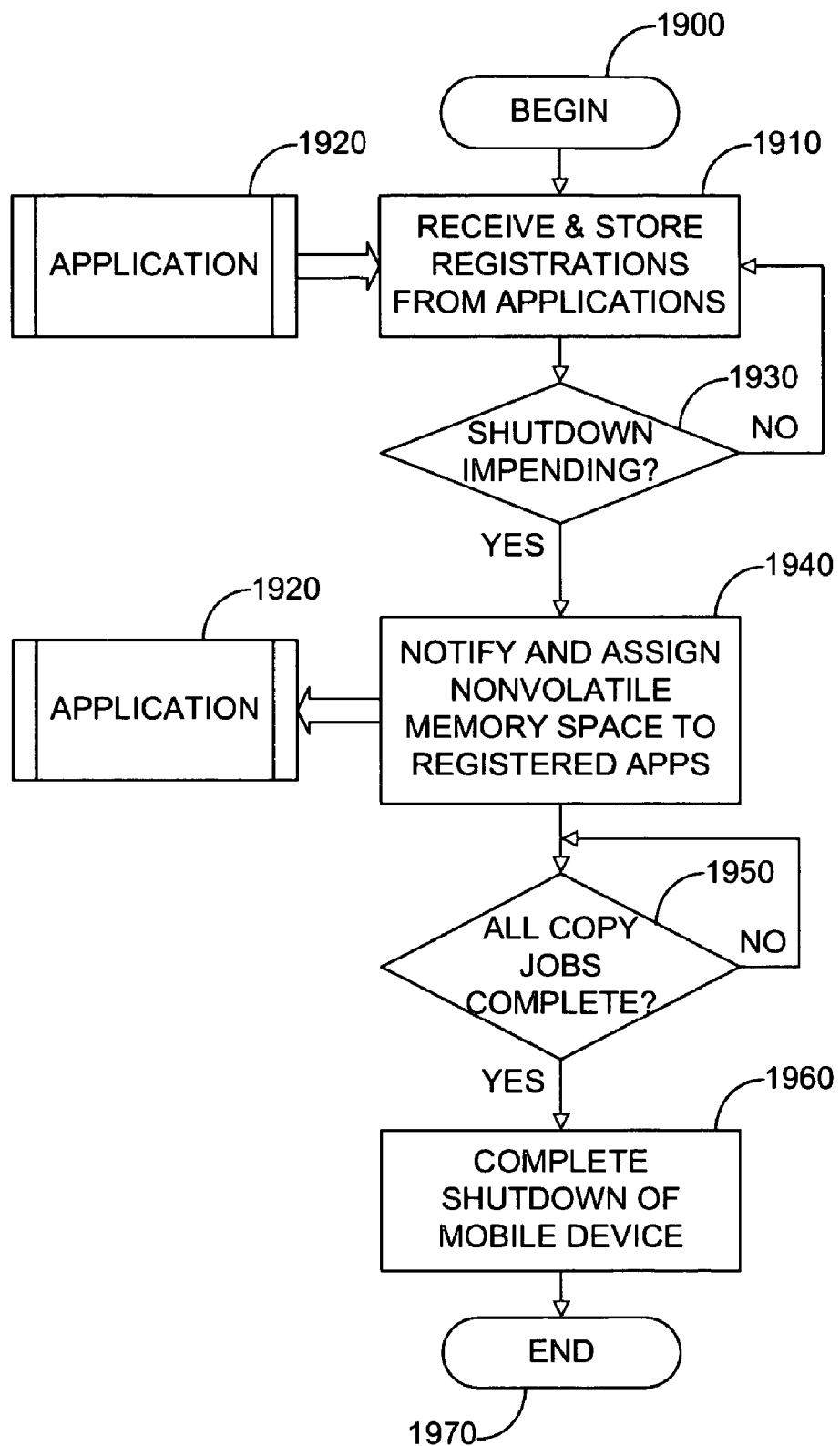
FIG. 17A is a flowchart illustrating an operational scenario for a shutdown manager of a mobile device configured to register applications to use a shutdown manager.

FIG. 17A depicts a different operational scenario associated with a shutdown manager on the mobile device. The process begins at block 1900, during which the mobile device can be operating normally. At process block 1910, receives and stores registrations from one or more applications 1920. It should be understood that these registrations can be stored in either volatile or nonvolatile memory (not shown) available to the shutdown manager. At decision block 1930, the shutdown manager determines whether a notification of an impending shutdown has been received from the mobile device. The impending shutdown could be caused by a number of different factors, including, for example, a low battery, user initiated shutdown, etc. If there has been no notification of a shutdown received, the shutdown manager continues to collect registrations from the applications 1920.

Upon receiving notification of an impending shutdown, the shutdown manager notifies the registered applications 1920 of the impending shutdown and assigns non-volatile memory space to the registered applications 1920, as shown in process block 1940. The registered applications 1920 then begin jobs to save their volatile memory to the assigned nonvolatile memory space. Thus, the volatile memory contents associated with the registered applications can be saved during shutdown of the mobile device.

The shutdown manager then waits until the jobs are complete, as shown by decision block 1950. Upon completion of the jobs on the mobile device, the shutdown manager completes the shutdown of the mobile device, as shown by process block 1960, by terminating operations on the mobile device and removing power from the volatile memory and the processor, among others. The completion of the shutdown can further include writing a fast-start enable flag to the non-volatile memory, as well as the calculation of a cyclic redundancy check and writing of the calculated CRC to memory. It should also be noted that nominal power can be supplied to a RAM, thereby creating a nonvolatile memory space. The process ends at termination block 1970 with the mobile device being shutdown.

Figure 17B:
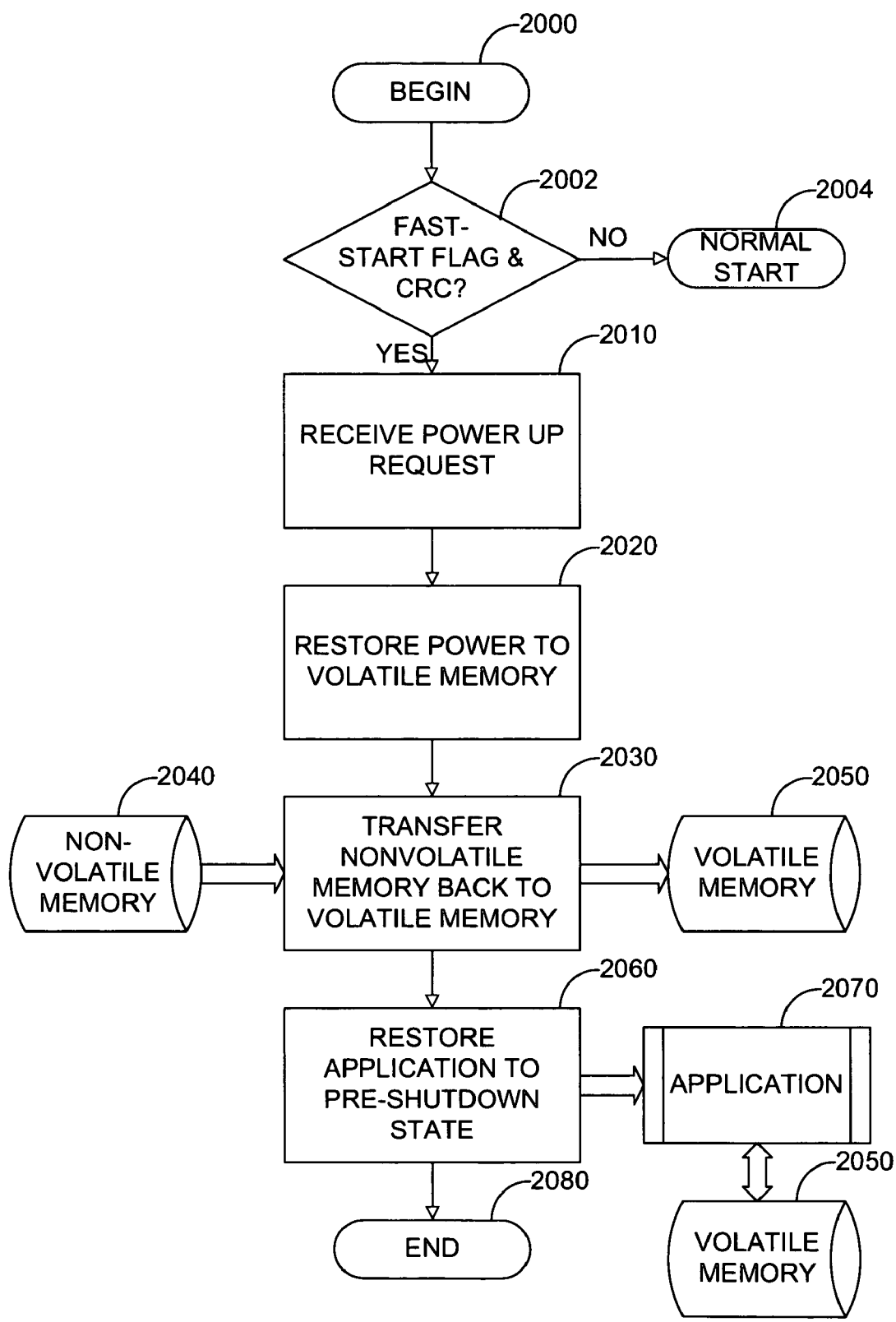
FIG. 17B is a flowchart illustrating an operational scenario for a startup manager of a mobile device configured to include a fast-start flag and a cyclic redundancy check.

FIG. 17B depicts a different operational scenario associated with a startup manager on the mobile device. The process begins at block 2000, which could be a complete shutdown state of the mobile device. Alternatively, block 2000 could be in the middle of the process of shutting down the mobile device.

As shown by decision block 2002, the startup manager checks a fast-start enable flag and a stored CRC value to determine whether these values enable transfer of the non-volatile memory contents to volatile memory. The fast-start enable flag can be compared to a stored enable flag, while the stored CRC value can be compared to a calculated CRC for stored nonvolatile memory contents. These checks help to determine whether the memory content of the nonvolatile memory 2040 has been written correctly, and not corrupted during shutdown of the mobile device. If these values are not correct, the startup manager can perform a normal startup, as shown by termination block 2004.

If the enable flag and CRC are correct, the startup manager receives a power up request in process block 2010, which can come from the user. Process block 2020 shows the startup manager restoring power to the volatile memory. It should be understood that this step can be automatically completed by the mobile device upon startup.

In process block 2030, the startup manager restores volatile memory 2050 of the device to the same state in which the volatile memory 2050 existed prior to the shutdown. The startup manager accomplishes this step by retrieving memory contents from the nonvolatile memory 2040, and copying those memory contents to the volatile memory 2050. It should be noted, that the startup manager can also perform a cleanup during transfer from nonvolatile memory 2040 to volatile memory 2050, by deleting the memory contents in nonvolatile memory 2040 that have been transferred to the volatile memory 2050.

Process block 2060 shows the startup manager restoring the application(s) 2070 on the mobile device to their pre-shutdown state, based upon the memory content being transferred to their associated volatile memory 2050. The operational scenario ends at termination block 2080. However, it should be noted that the mobile device can continue to execute the application(s) 2070 after completing the operational scenario outlined above.

Figure 18A:
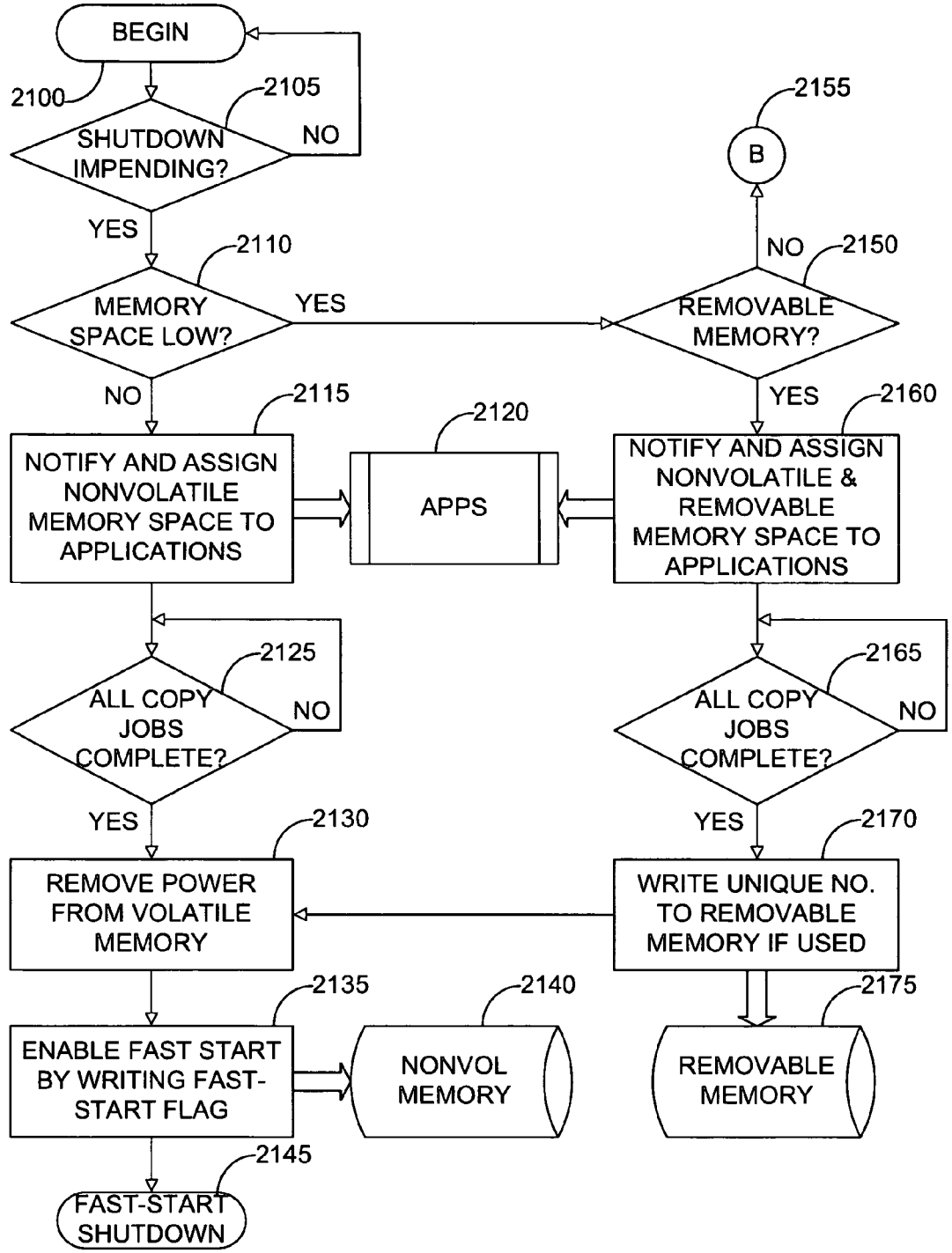
FIGS. 18A and 18B are flowcharts illustrating operational scenarios for a shutdown manager of a mobile device configured to use removable memory as additional nonvolatile storage.

FIG. 18A depicts a different operational scenario associated with a shutdown manager on the mobile device. The process begins at block 2100, during which the mobile device can be operating normally. At decision block 2105, the shutdown manager waits for notification of an impending shutdown. Upon receipt of an impending shutdown notice, the shutdown manager checks the memory to determine whether the nonvolatile memory in the mobile device is low (e.g., the memory does not relatively contain sufficient amount of free space to store the application's volatile memory contents), as shown by decision block 2110.

If the nonvolatile memory space is not low, the shutdown manager proceeds to process block 2115 where the shutdown manager notifies applications 2120 of the impending shutdown and assigns nonvolatile memory space 2140 to the applications 2120. The shutdown manager then waits for the completion of the copy jobs, as shown by decision block 2125.

Upon completion of the copy jobs, the shutdown manager removes power from the volatile memory, as shown in process block 2130. As shown in process block 2135, the shutdown manager then completes shutdown by writing a fast-start enable flag to nonvolatile memory 2140. The process ends at termination block 2145, indicating that all operations on the device have been terminated.

If the nonvolatile memory space on the mobile device is low in decision block 2110, the shutdown manager proceeds to decision block 2150, where the shutdown manager determines whether a removable storage device is attached to the mobile device. If a removable storage device is not attached to the mobile device, the process continues to reference block 2155.

However, if a removable memory device is attached to the mobile device, the shutdown manager notifies the applications 2120 of the impending shutdown and assigns removable and nonvolatile memory to the applications 2120, as shown by process block 2160. In one example, nonvolatile memory and/or removable memory can be used to store fully decompressed items. Compressed items can consume time and processing power to decompress. Therefore, the decompression step may be omitted on startup by including a decompressed version of the memory contents. The shutdown manager then waits for all copy jobs to be completed, as shown by decision block 2165.

Upon completion of all copy jobs, the shutdown manager writes a unique identification to the removable memory 2175, as shown in process block 2170. The shutdown manager then proceeds to process block 2130 and removes power from the volatile memory. The shutdown manager then writes the fast-start enable flag to nonvolatile memory 2140, as shown in process block 2135, thereby enabling use of the nonvolatile memory upon startup. The process ends as termination block 2145, which indicates that all operations on the device have been terminated.

Figure 18B:
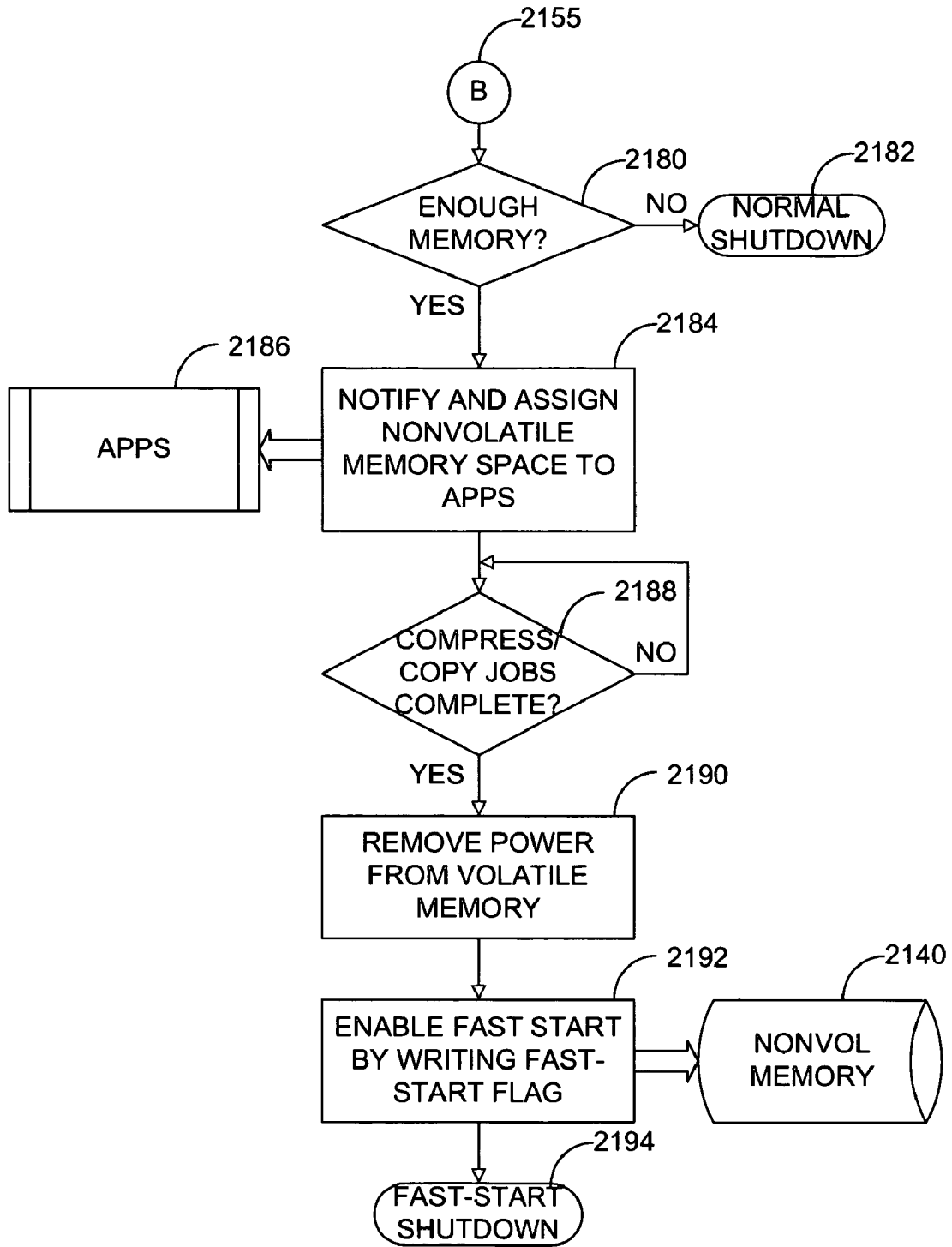

Returning to reference block 2155, FIG. 18B describes a low memory operational scenario for a shutdown manager. In decision block 2180, the shutdown manager determines whether the mobile device contains enough nonvolatile memory to store the volatile memory contents in a compressed state. If the mobile device does not contain enough nonvolatile memory to store the volatile memory contents in a compressed state, the mobile device performs a normal shutdown. It should be noted, however, that the mobile device could implement a garbage cleanup algorithm before making the determination of whether enough memory space exists to store the compressed volatile memory contents.

Upon determining that sufficient memory exists to store the compressed volatile memory contents, the shutdown manager notifies and assigns nonvolatile memory space to the applications 2186, as shown by process block 2184. This notification could also include instructions to compress the volatile memory data prior to storage in the nonvolatile memory. As shown by decision block 2188, the shutdown manager waits for all jobs to complete.

After all jobs have been completed, the shutdown manager proceeds to process block 2190 and removes power from the volatile memory. The shutdown manager then writes the fast-start enable flag to nonvolatile memory 2140, as shown in process block 2192, thereby enabling use of the nonvolatile memory upon startup. The process ends as termination block 2194, which indicates that all operations on the device have been terminated.

Figure 18C:
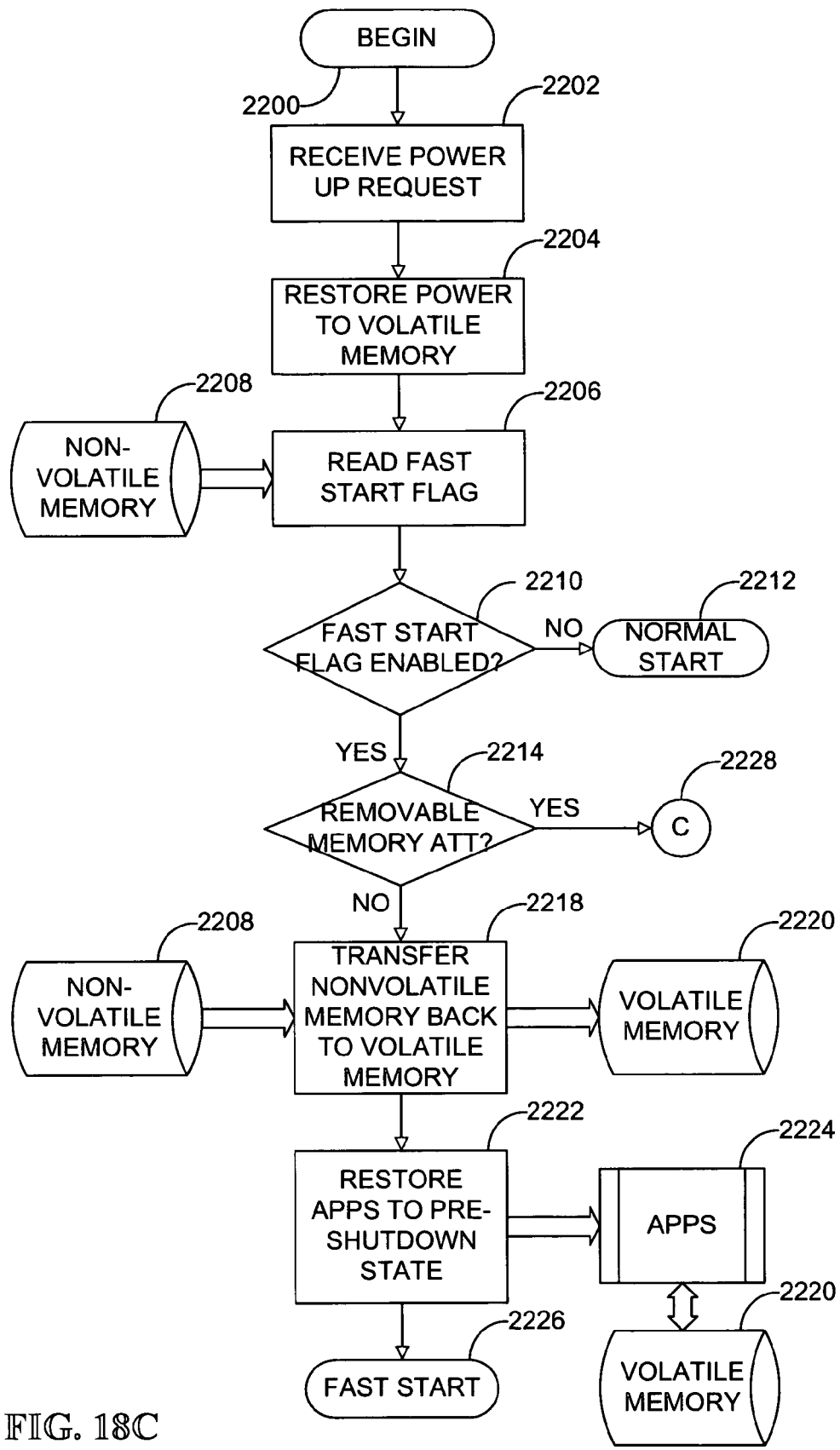
FIGS. 18C and 18D are flowcharts illustrating operational scenarios for a startup manager of a mobile device configured to use removable memory as additional nonvolatile storage.

FIG. 18C depicts a different operational scenario associated with a startup manager on the mobile device. The process begins at block 2200, which could be a complete shutdown state of the mobile device. Alternatively, block 2000 could be in the middle of the process of shutting down the mobile device.

The startup manager receives a power up request via the mobile device, as shown by process block 2202. Upon receiving the power up request from the mobile device, the startup manager restores power to the volatile memory in process block 2204. The startup manager then reads the fast-start flag from nonvolatile memory 2208 in process block 2206. As shown by decision block 2210, the startup manager compares the fast-start flag to an expected fast start flag, to determine if the contents of the nonvolatile memory 2208 may be used for a fast-start. If the stored flag does not match the expected flag, the startup manager performs a normal start 2212.

If the stored flag matches the expected fast-start flag, the startup manager proceeds to decision block 2214, where it is determined whether removable memory is expected to be attached to the mobile device. If no removable memory is expected to be attached to the mobile device, the startup manager transfers the nonvolatile memory 2208 to the volatile memory 2220, as shown by process block 2218, decompressing the nonvolatile memory contents, if they have been compressed. Process block 2222 shows the startup manager restoring the application(s) 2224 on the mobile device to their pre-shutdown state, based upon the memory content being transferred to their associated volatile memory 2220. The fast-start is complete as shown by termination block 2226, thereby enabling the mobile device to continue processing where it stopped prior to the shutdown.

Figure 18D:
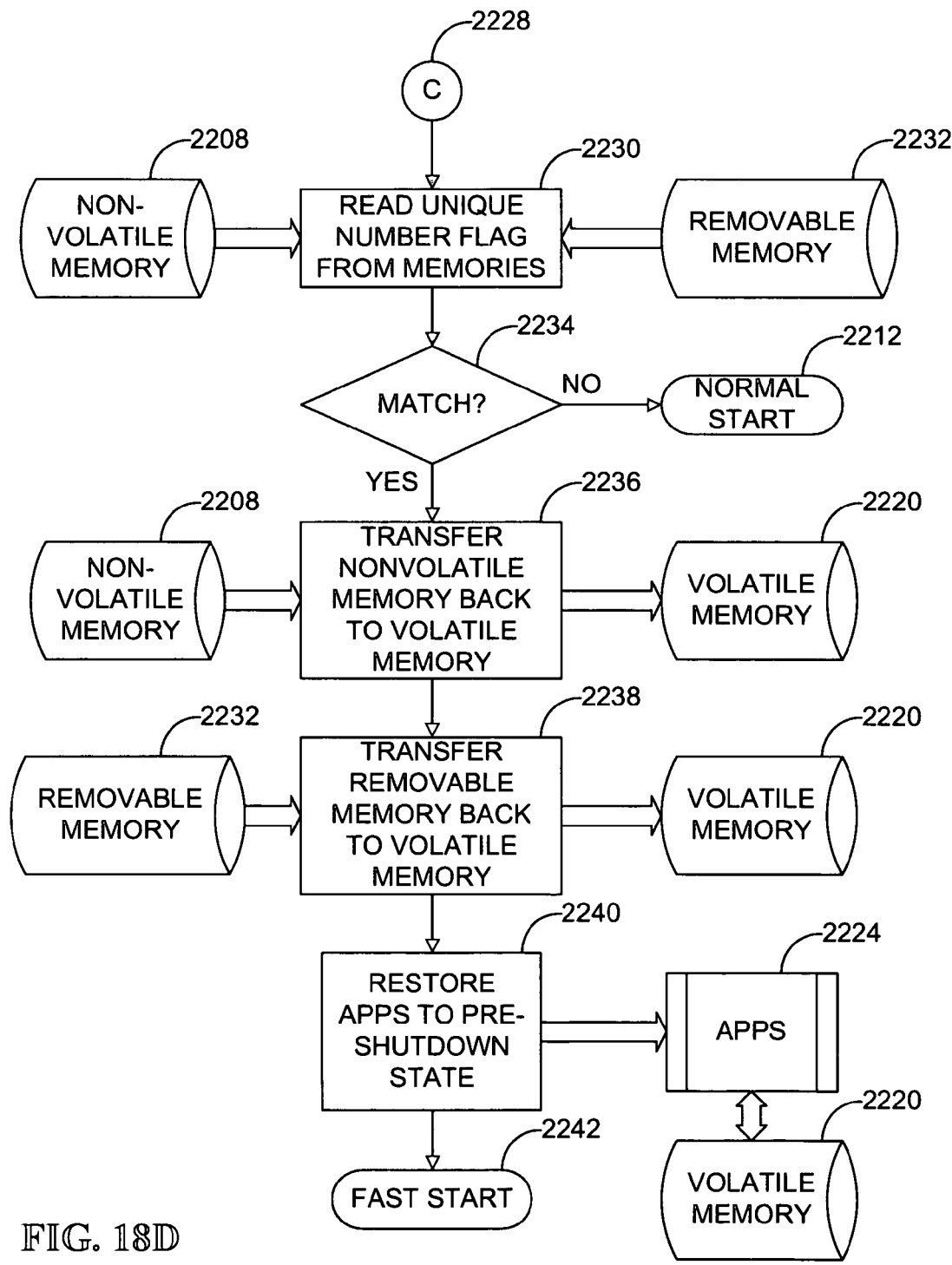

Returning to decision block 2214, if a removable memory is expected to be attached to the mobile device, the startup manager proceeds to a removable memory operational scenario 2228 as shown in FIG. 18D. In process block 2230, the startup manager reads the unique number from removable memory 2232, and the expected unique number from nonvolatile memory 2208. As shown by decision block 2232, if the unique number from removable memory and the expected unique number do not match, as shown in decision block 2234, the startup manager performs a normal startup, marked by termination block 2212. It should be noted that in one example, a compressed version of the removable memory contents could be stored in the nonvolatile memory 2208. In this example, the fast start process could proceed without a valid removable memory device attached to the mobile device. However, such an alternative operational scenario would include a process block to decompress the compressed data stored in the nonvolatile memory 2208.

However, if the unique number from removable memory 2232 and the expected unique number from nonvolatile memory 2208 match, the startup manager proceeds by transferring the contents of the non-volatile memory 2208 back to volatile memory 2220, as shown by process block 2236. As shown by process block 2238, the startup manager continues by transferring the contents of the removable memory 2232 back to volatile memory 2220. It should be recognized that both the nonvolatile memory 2208 and the removable memory 2232 can be used to store decompressed data, and that the decompressed data can be transferred directly to volatile memory 2220 upon startup.

Process block 2240 shows the startup manager restoring the application(s) 2224 on the mobile device to their pre-shutdown state, based upon the memory content being transferred to their associated volatile memory 2220. The operational scenario ends at termination block 2242. However, it should be noted that the mobile device continues to execute the application(s) 2224 after completing the operational scenario outlined above.

Figure 19A:
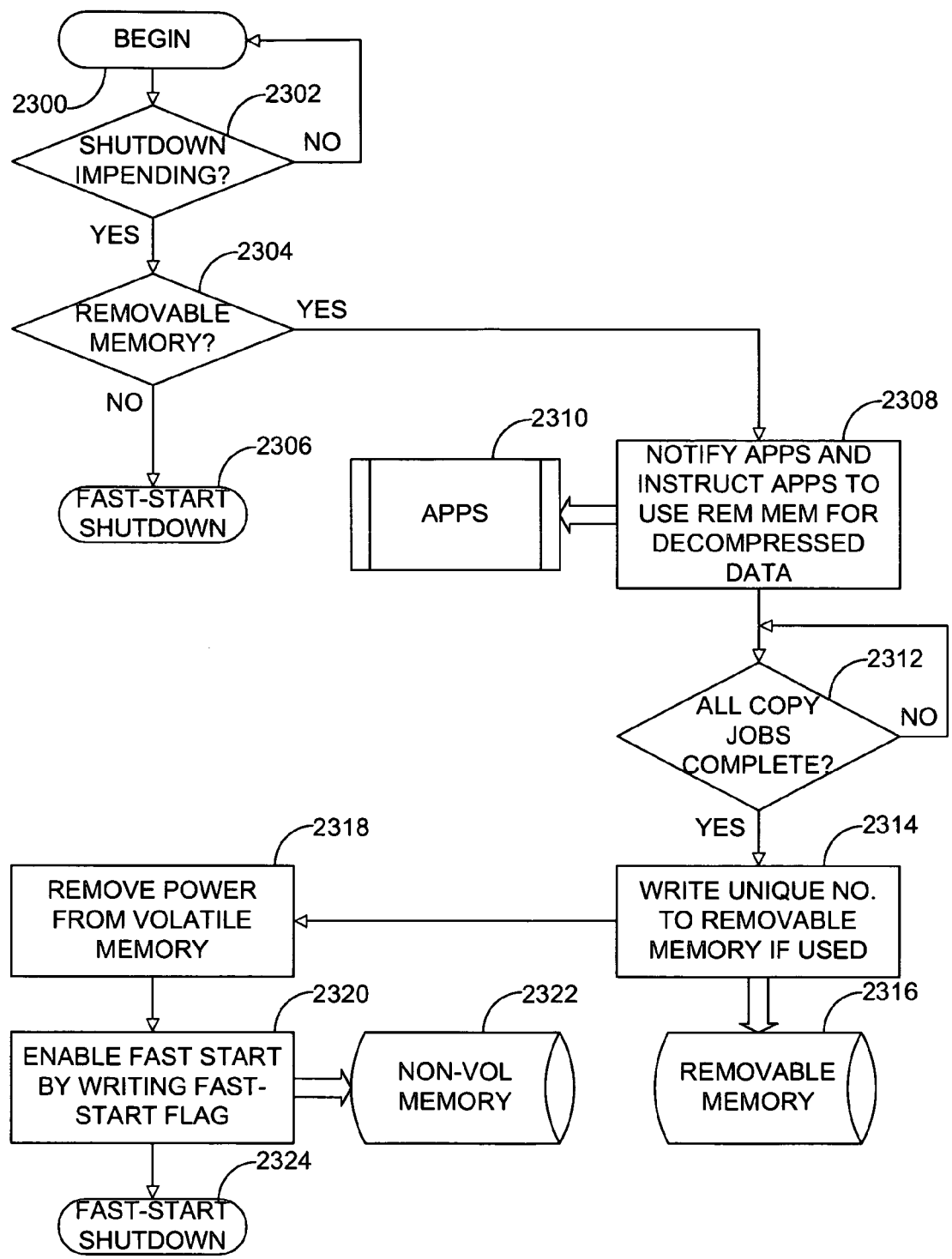
FIG. 19A is a flowchart illustrating an operational scenario for a shutdown manager of a mobile device configured to use a removable memory to store decompressed volatile data.

FIG. 19A depicts a different operational scenario associated with a shutdown manager on the mobile device. The process begins at block 2300, during which the mobile device can be operating normally. At decision block 2302, the shutdown manager waits for notification of an impending shutdown. Upon receipt of an impending shutdown notice, the shutdown manager determines whether removable memory is attached to the system. Removable memory can be any sort of removable nonvolatile memory device, such as removable flash.

If there is no removable memory attached to the mobile device, the mobile device can perform a fast start shutdown, as disclosed herein, and as shown by termination block 2306. It should be understood that the fast start shutdown can comprise notifying the applications of the impending shutdown, and removing power from the volatile memory after the applications have completed their respective jobs associated with ensuring the storage of volatile memory contents in nonvolatile memory.

Returning to decision block 2304, if there is a removable memory attached to the mobile device, the shutdown manager notifies the applications 2310, and instructs the applications to use the removable memory for decompressed data, as shown by process block 2308, thereby conserving non-removable nonvolatile memory space. The shutdown manager then waits for the completion of any jobs spawned by the applications 2310 in view of shutdown, as shown by decision block 2312.

Upon completion of the jobs, the shutdown manager writes a unique identification to the removable memory 2316, as shown in process block 2314. The shutdown manager then proceeds to process block 2318 and removes power from the volatile memory. The shutdown manager then writes the fast-start flag to nonvolatile memory 2322, as shown in process block 2320, thereby enabling use of the nonvolatile memory upon startup. The process ends as termination block 2324, which indicates that all operations on the device have been terminated.

Figure 19B:
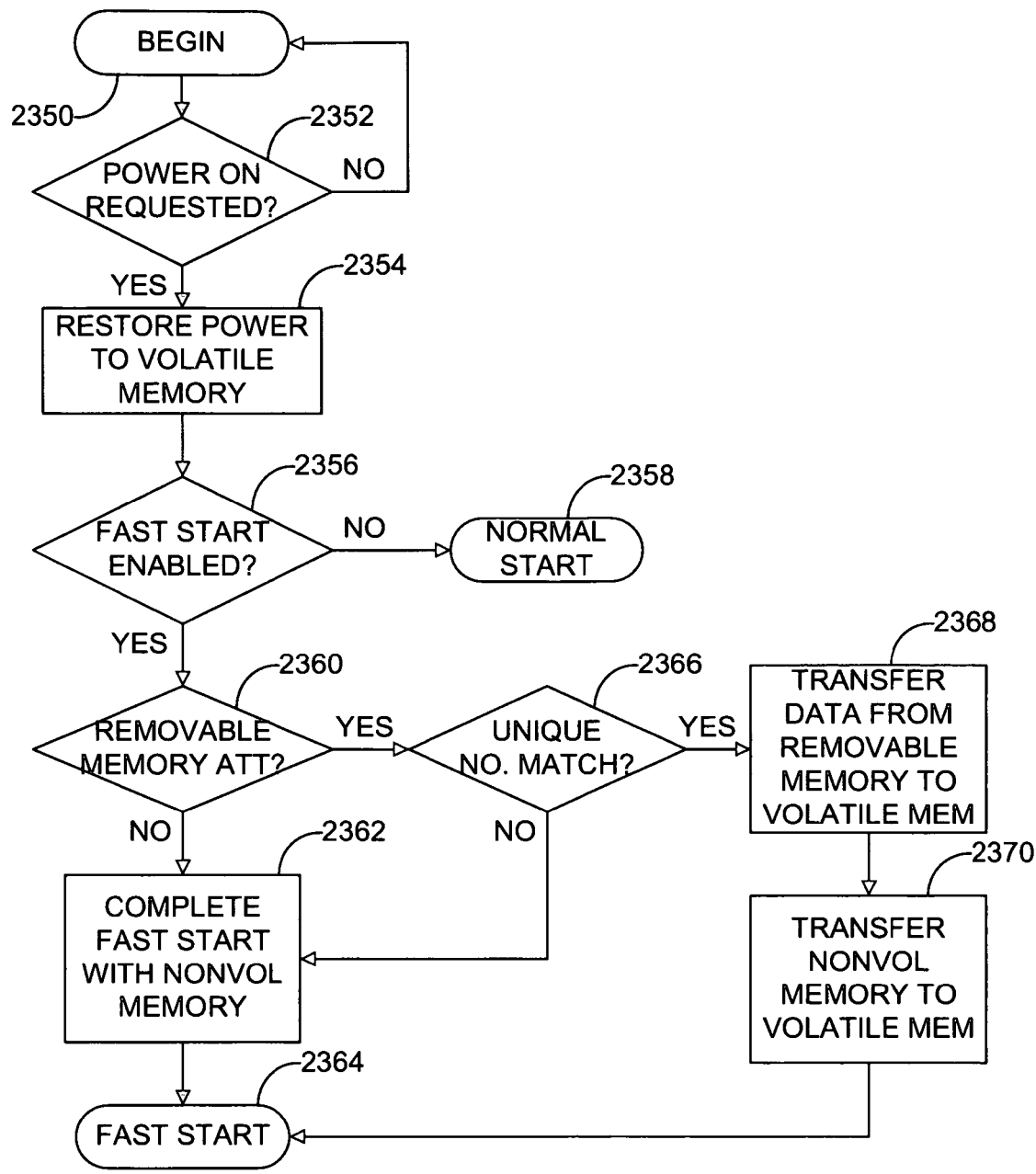
FIG. 19B is a flowchart illustrating an operational scenario for a startup manager of a mobile device configured to use a removable memory to retrieve decompressed data.

FIG. 19B depicts a different operational scenario associated with a startup manager on the mobile device. The process begins at block 2350, which could be a complete shutdown state of the mobile device. Alternatively, block 2350 could be in the middle of the process of shutting down the mobile device.

As shown by decision block 2352, the startup manager waits for a power on request from the mobile device. Upon receiving the power on request, in process block 2354 the startup manager restores power to the volatile memory. It should be noted, however, that the restoration of power to the volatile memory could occur through some other process executing on the mobile device.

At decision block 2356, the startup manager determines whether the fast start flag is enabled. If the fast start flag has not been enabled, the startup manager proceeds with a normal start, as shown by termination block 2358. The normal startup can include starting the operating system, the virtual memory, and any other applications or code specified by the configuration of the mobile device. However, it should be understood that these systems do not receive the benefit of the stored volatile memory contents.

If the fast start has been enabled, decision block 2360 shows that the startup manager determines whether a removable memory is attached to the mobile device. If there is no removable memory attached to the mobile device, the startup manager completes a fast start scenario by using the nonvolatile memory, as shown by step 2362. The fast start process terminates at termination block 2364, whereby the mobile device continues operation at the point at which it was previously shutdown.

However, if the startup manager detects removable memory attached to the mobile device, as shown by decision block 2366, the startup manager determines whether the unique identification recorded in the removable memory matches the unique identifier expected according to nonvolatile memory. Upon determining that the unique identifiers do not match, the fast start procedure is completed with nonvolatile memory, as shown by process block 2362. The operational scenario then terminates at termination block 2364, whereby the mobile device continues operation at the point at which it was previously shutdown.

If the unique number stored in removable memory matches the unique number from nonvolatile memory, the startup manager proceeds to process block 2368, whereby the data from the removable memory is transferred into nonvolatile memory. In process block 2370, the startup manager transfers the remaining nonvolatile memory to volatile memory, and restores the applications to their pre-shutdown state, as described herein. The operational scenario then terminates at termination block 2364, whereby the mobile device continues operation at the point at which it was previously shutdown. It should be noted that the use of removable memory to store decompressed data can significantly lower the startup time by reducing decompression steps for data being transferred from the nonvolatile memory to volatile memory.

One or more systems and methods described herein may be useful on mobile devices that do not include a hibernation or sleep mode operation for the mobile device. In accordance with the above disclosure, the performance of the mobile device upon startup from a power off mode can be accelerated through restoration of pre-shutdown data. For example, a virtual machine memory heap can be transferred on startup from nonvolatile memory to the volatile memory of the mobile device, thereby enabling applications (e.g., a virtual machine) to begin execution at the same point at which the applications were terminated prior to shutdown. Moreover, a shutdown operational scenario can include a simulation of completing the shutdown, while still performing the storage of volatile memory contents into nonvolatile memory, thereby conserving energy and allowing the user to believe that the device has been powered off.

What is claimed is:

1. A method for operation upon a mobile communications device, the method comprising the steps of:
   receiving notification of a shutdown request;
   notifying at least one application executing on the mobile communications device of the shutdown request;
   simulating a shutdown of the mobile communications device by powering down input/output devices;
   wherein volatile memory contents associated with said at least one application are stored in a nonvolatile memory device before completing shutdown of the mobile communications device;
   said powering down including removing power from a user interface prior to completing storage of the volatile memory contents of said at least one application to the nonvolatile memory device, such that the mobile communications device appears to a user to be shutdown; and
   aborting the shutdown upon receiving a power up request prior to said completing storage of the volatile memory contents, wherein said aborting the shutdown comprises resetting the mobile communications device without removing power to volatile memory and restoring power to the user interface.

2. The method of claim 1, wherein the data in the volatile memory is otherwise lost upon said shutdown if not for the storing of the volatile memory contents in a nonvolatile memory device.

3. The method of claim 1, wherein the storage of the volatile memory contents are used to continue execution of an application upon the mobile communication device's startup, thereby enabling the application to resume operation more quickly after said startup.

4. The method of claim 1, further comprising the step of registering said at least one application on a registration list prior to receiving the shutdown request.

5. The method of claim 4, further comprising the step of retrieving the registration list in order to provide the notification to said at least one application of the shutdown request.

6. The method of claim 1, wherein the nonvolatile memory device is a powered random access memory device supplied with power during shutdown of the mobile communications device.

7. The method of claim 1, wherein the nonvolatile memory device is a memory device whose contents are not lost by the shutdown of the mobile communications device.

8. The method of claim 1, wherein the nonvolatile memory device is a flash memory device.

9. The method of claim 8, wherein the step of storing the volatile memory contents comprises the step of transferring the volatile memory contents to a storage block of the nonvolatile storage device, said method further comprising restoring said at least one application by restoring the volatile memory contents associated with the application using the contents of the storage block of the nonvolatile storage device.

10. The method of claim 1, wherein the nonvolatile memory device comprises non-removable nonvolatile memory configured to store compressed data, and a removable memory device configured to store decompressed data.

11. The method of claim 10, further comprising the steps of:
    storing a unique identifier in the removable nonvolatile memory,
    upon startup, verifying the unique identifier;
    transferring contents from the removable nonvolatile memory into flash based upon the verifying step.

12. The method of claim 1, wherein the mobile communications device does not have a sleep mode, wherein the shutdown comprises termination of all operations on the mobile communications device.

13. The method of claim 1, further comprising restoring said at least one application upon power up request with the volatile memory contents that were stored prior to shutdown.

14. The method of claim 13, wherein the step of restoring the application further comprises the step of ensuring that the memory device has not been corrupted prior to the restoring the application.

15. The method of claim 1, further comprising the steps of:
    setting a fast-start enable flag in the memory device upon completion of the storing step in order to enable the restoring step on power up; and
    determining that the fast-start enable flag is set prior to restoring said at least one application.

16. The method of claim 15, wherein the fast-start enable flag comprises a plurality of bits which is configured to enable the fast-start upon the flag being set to the pattern of bits.

17. The method of claim 1, further comprising the steps of:
    calculating a cyclic redundancy check (CRC) value for the volatile memory contents upon receiving the shutdown request;
    storing the CRC value for the volatile memory contents;
    upon receiving the power up request, calculating a CRC value for the memory device contents;
    comparing the calculated CRC value to the stored CRC value in order to determine whether corruption has occurred; and
    restoring said at least one application based upon the comparing step.

18. A system for handling software operations occurring on a mobile communications device, wherein nonvolatile memory is configured to hold data after shutdown of the mobile communications device; wherein volatile memory is configured to store volatile memory contents for an application during execution on the mobile wireless communications device; the system comprising:

a shutdown manager configured to receive notification of an impending shutdown on the mobile communications device;

wherein the shutdown manager is configured to notify the application of the impending shutdown and to assign a memory block of the nonvolatile memory to the application, the shutdown manager being further configured to retain power until the application has stored its volatile memory contents to the assigned memory block; and a startup manager configured to transfer the stored volatile memory contents back to volatile memory for use by the application based upon the mobile communications device receiving a startup request;

wherein the shutdown manager is further configured to remove power from a user interface prior to the application completing storage of the volatile memory contents to the nonvolatile memory, such that the mobile communications device appears to a user to be shutdown;

wherein the shutdown manager is further configured to abort the shutdown upon receiving the startup request prior to the application completing storage of the volatile memory contents, wherein said aborting the shutdown comprises resetting the mobile communications device without removing power to the volatile memory and restoring power to the user interface.

19. The system of claim 18, wherein said shutdown comprises termination of all operations of the mobile communications device.

20. The system of claim 18, wherein the shutdown manager is further configured to receive registrations for storage of volatile memory contents during execution of said application on the mobile communications device, and upon receiving the shutdown request, the shutdown manager is further configured to use the registrations to notify the application of the impending shutdown.

21. The system of claim 20, wherein the volatile memory contents are transferred to a storage block of the nonvolatile storage device upon shutdown, wherein the volatile memory contents associated with the application are transferred from the nonvolatile memory to the volatile memory upon startup.

22. The system of claim 18, wherein the shutdown manager is configured to set a flag in the non-volatile memory device upon the completion of the storage of the volatile memory contents, and the startup manager is configured to cheek that the flag is set prior to transferring the stored volatile memory contents back to volatile memory.

23. The system of claim 18, wherein the startup manager further comprises a means for checking for corruption in order to check that the data stored in the nonvolatile memory has not been corrupted between shutdown and startup of the mobile communications device.

24. A system for improving software operations on a mobile communications device, the system comprising:

means for receiving notification of a power down request;

means for notifying at least one application executing on the mobile communications device of the power down request;

means for storing volatile memory contents associated with said at least one application in a nonvolatile memory device before shutdown of the mobile communications device;

means for restoring, upon a power up request, said at least one application with the volatile memory contents that were stored prior to shutdown;

means for removing power from a user interface prior to completing storage of the volatile memory contents to the nonvolatile memory device, such that the mobile communications device appears to a user to be shutdown; and means for aborting the shutdown upon receiving the power up request prior to completing storage of the volatile memory contents, wherein said aborting the shutdown comprises resetting the mobile communications device without removing power to volatile memory and restoring power to the user interface.

25. A method for operation upon a mobile communications device, the method comprising the steps of:

receiving notification of a shutdown request;

notifying at least one application executing on the mobile communications device of the shutdown request;

wherein volatile memory contents associated with said at least one application are stored in a nonvolatile memory device before shutdown of the mobile communications device, thereby avoiding the loss of the volatile memory contents upon said shutdown; and upon a power up request, restoring said at least one application with the volatile memory contents that were stored prior to shutdown;

wherein power is removed from a user interface prior to completing storage of the volatile memory contents to the nonvolatile memory device, such that the mobile communications device appears to a user to be shutdown;

wherein the shutdown is aborted upon receiving the power up request prior to completing storage of the volatile memory contents, wherein said aborting the shutdown comprises resetting the mobile communications device without removing power to volatile memory and restoring power to the user interface.

* * * * *

UNITED STATES PATENT AND TRADEMARK OFFICE
CERTIFICATE OF CORRECTION

PATENT NO. : 7,489,923 B2
APPLICATION NO. : 11/198687
DATED : February 10, 2009
INVENTOR(S) : Marcelo Varanda It is certified that error appears in the above-identified patent and that said Letters Patent is hereby corrected as shown below:

In Column 24, Line 34, "upon power" should read -- upon the power --.

In Column 25, Line 44, "cheek" should read -- check --.

Signed and Sealed this

Twenty-fourth Day of March, 2009

JOHN DOLL
*Acting Director of the United States Patent and Trademark Office*